(12) United States Patent
McCue et al.

(10) Patent No.: US 7,996,299 B2
(45) Date of Patent: Aug. 9, 2011

(54) TRADE SERVICES MANAGEMENT SYSTEM

(75) Inventors: Jack McCue, Abington, PA (US); Steve Anderson, Kirkland, WA (US); Tom Maccariella, Lumberton, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 403 days.

(21) Appl. No.: 12/059,571

(22) Filed: Mar. 31, 2008

(65) Prior Publication Data

US 2009/0204462 A1 Aug. 13, 2009

Related U.S. Application Data

(60) Provisional application No. 61/027,589, filed on Feb. 11, 2008.

(51) Int. Cl.
*G06Q 40/00* (2006.01)
(52) U.S. Cl. ......................................................... 705/37
(58) Field of Classification Search ...................... 705/37
See application file for complete search history.

(56) References Cited

U.S. PATENT DOCUMENTS

| | | | | |
|---|---|---|---|---|
| 6,408,277 | B1 * | 6/2002 | Nelken | 705/7.15 |
| 2005/0075964 | A1 * | 4/2005 | Quinn et al. | 705/37 |
| 2005/0075967 | A1 * | 4/2005 | Sandhu et al. | 705/37 |
| 2007/0282858 | A1 * | 12/2007 | Arner et al. | 707/10 |

OTHER PUBLICATIONS

Misys Trade Innovation. http://www.misysbanking.com/Misys_Banking_Family/Trade_Innovation/index.html. Last accessed Mar. 28, 2008.
Nature—International Weekly Journal of Science. Complex Systems: Ecology for Bankers. http://www.nature.com/nature/journal/v451/n7181/full/451893a.html. Last accessed Mar. 28, 2008.
China Systems Corporation. Eximbills Enterprise is 1st Back Office solution accredited with the SWIFTNet TSU Gold Label. http://www.chinasystems.com. Last accessed Mar. 28, 2008.

* cited by examiner

*Primary Examiner* — Charles R Kyle
*Assistant Examiner* — Clifford Madamba
(74) *Attorney, Agent, or Firm* — Kegler Brown Hill & Ritter; James J. Pingor

(57) ABSTRACT

A system (and corresponding methodology) that supports trade services back office processing to enhance efficiency and productivity is provided. The system employs a unique consolidated screen layout that significantly improves the productivity of the users. Essentially, the system and page layout is composed of the following components: Queue Well, Activity Center, Message Center, Viewing Center and Action Tab. These components facilitate organization of panels that creates an intuitive user interface experience. The system employs a navigational hierarchy of Queue Well to Activity Center and then to the Message and Viewing Centers as appropriate.

12 Claims, 28 Drawing Sheets

TRADE SERVICES MANAGEMENT SYSTEM

CROSS REFERENCE TO RELATED APPLICATIONS

This application claims the benefit of U.S. Provisional Patent application Ser. No. 61/027,589 entitled "TRADE SERVICES MANAGEMENT SYSTEM" and filed Feb. 11, 2008. The entirety of the above-noted application is incorporated by reference herein.

BACKGROUND

A Letter of Credit (LC) is a document most often issued by a bank or other financial institution to secure funds on behalf of a beneficiary. The LC usually provides an irrevocable payment on behalf of the beneficiary however, sometimes payment can be revocable, confirmed, unconfirmed, transferable, etc. Payment to a beneficiary is governed by the terms included in LC, which most often require presentation and compliance of documents such as shipment notifications, bills of lading, etc.

In operation, when the beneficiary or a presenting bank acting on behalf of the beneficiary makes a presentation to the issuing bank or confirming bank, if any, within the terms of the LC, the confirming bank is obligated to issue payment. Most often, this presentation includes documents (e.g., shipping notification, bill of lading . . .) which satisfy the terms and conditions of the LC. In other words, once the LC is issued, the applicant cannot stand in the way of payment for any reason so long as the terms of the LC are satisfied. Essentially, the obligation to honor payment is shifted from the applicant to the issuing bank or confirming bank, if any. In some situation, non-banks can also issue LCs however, the risk is most often too high for a party to justify acceptance of such LCs.

In other situations, an LC can also be the source of payment for an international trade transaction. For example, oftentimes, an exporter will get paid by redeeming the LC. Today, international trade transactions of significant value often employ LCs to ensure payment. For instance, the LC lowers risk factors associated with deals between a supplier in one country and a wholesale customer in another. In these situations, it is not uncommon for the parties to not know each other. Thus, the LC provides a level of security in promoting such international deals.

Most all LCs are irrevocable and therefore cannot be amended or canceled without prior agreement of the beneficiary, the issuing bank and the confirming bank, if applicable. Typically, the documents a beneficiary has to present in order to avail themselves of the credit are commercial invoice(s), bill(s) of lading, insurance document(s), etc. However, as with any contractual relationship, requirements with respect to documents are open to imagination, negotiation and agreement.

As LCs continue to emerge as an important component of many business relationships, management of LCs has become an increasingly lucrative venture for banks and other trusted financial institutions. Unfortunately, many of the institutions are becoming so inundated with managing and tracking LCs that a majority of their resources are spent managing rather than increasing volume. Conventional systems used to manage LCs are a compilation of many different processes, many of which are manual book keeping leaving the door open to human error, inefficiencies and the like.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that supports trade services back office processing. Aspects of the innovation employ a unique screen layout that significantly improves the productivity of the users of the system. Oftentimes, the users are employees of a financial institution or bank that use the application as a hosted, in-sourcing service. Effectively, the innovation streamlines the processes involved in the management and implementation of letters of credit (LCs), for example in trade services.

In particular embodiments, the system's graphical layout is composed of the following panels:
- A 'Queue Well' that provides a compressed view of pending work with color coded status indicators;
- An 'Activity Center' that provides a standard work palette for all transaction types that employs a data tile input mechanism;
- A 'Message Center' that provides access to related data within the context of the Activity Center display;
- A 'Viewing Center' that provides access to related documents and image files within the context of the Activity Center; and
- An 'Action Tab' that provides a quick link control to transaction complete, hold or abandon requests within the Activity Center.

The organization of the panels or panes is designed to create an intuitive user interface experience. The design employs a navigational hierarchy of Queue Well to Activity Center and then to the Message and Viewing Centers as appropriate. Thus, productivity of processing trade documents, such as LCs, is increased while expense of processing is lowered in view of the enhanced availability of resources.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 24 illustrates an example of a completed screen in accordance with an aspect of the innovation.

FIG. 25 illustrates examples of the work queue which essentially illustrates incorporation of sorting and filtering functionalities.

DETAILED DESCRIPTION

Figure 1:
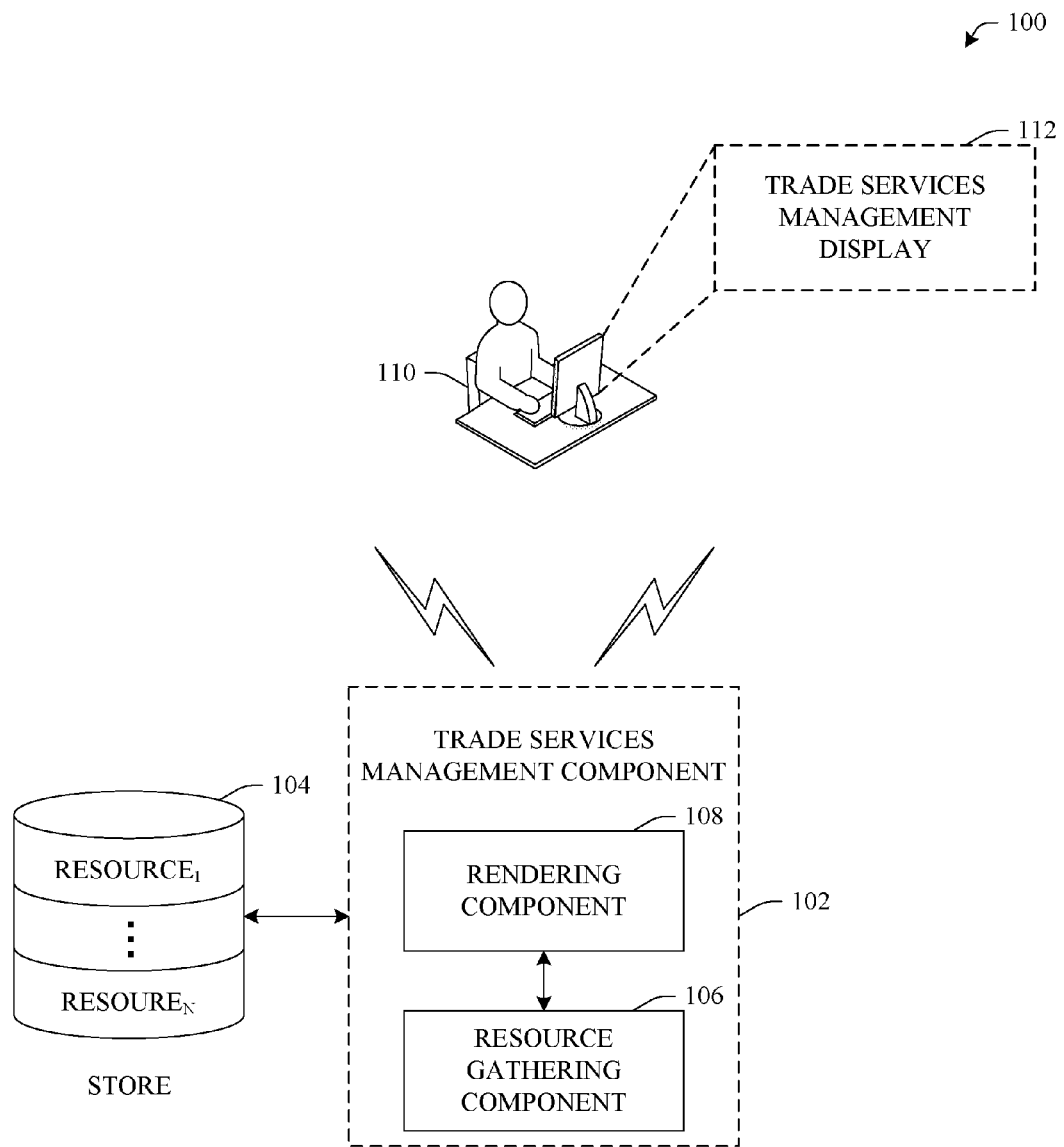
FIG. 1 illustrates an example block diagram of a system that employs a resource gathering component and a rendering component to facilitate trade services management in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As described above the innovation is directed to a system of components which can assist in a specific line of business, namely trade services. Each of the system's components will be described in graphical terms however, it is to be understood that the innovation includes the hardware, software or combination of hardware and software associated with each component that established the herein-described panes and tools.

Referring now to the drawings, FIG. 1 illustrates a system 100 that facilitates trade services management in accordance with an aspect of the innovation. Generally, system 100 includes a trade services management component 102 that locates, accesses, aggregates and presents resources from a store 104. As illustrated, the store 104 can include 1 to N resources that are associated with trade services. Although a single store 104 is illustrated in FIG. 1, it is to be understood that multiple stores, distributed stores or other sources can be employed in accordance with alternative aspects of the innovation. For example, in aspects, the trade services management component 102 can facilitate access to resources from most any source including, but not limited to, a local hard drive, server(s), third-party sites and services, etc. These alternative aspects are to be included within the scope of this specification and claims appended hereto.

As shown, the trade services management component 102 can include a resource gathering component 106 and a rendering component 108. Together, these components enable location and presentation of resources to a user 102 in accordance with a trade services (or other comparable) task or transaction.

As described above, a classic trade services transaction is a Letter of Credit (LC). While the innovation can assist financial institutions and other entities or customers in LC transactions, the innovation can be used in most any scenario where the funds (or other payment) are being collected and presented to a beneficiary on behalf of another party. In one aspect, the subject innovation employs a Rich Internet Application (RIA) (not shown) which provides a 'heavy client' where much of the work is performed by the browser (e.g., Internet browser). Here, the RIA is employed to aggregate and otherwise manage resources related to optimization of productivity and efficiency related to trade services businesses. Although the Internet is mentioned, it is to be understood that aspects can employ most any computer network can be employed in alternative embodiments without departing from the spirit and/or scope of this specification and claims appended hereto.

The trade services LC business can most often be considered a verbose transaction much like a complex contract. Thus, there are frequently many terms (and criteria) that must be met prior to releasing funds to a beneficiary. As well, there is most often a large amount of narrative and documentation attached to an LC transaction.

To properly execute an LC, it would be extremely helpful to be able to access, consolidate and render associated resources and information upon a workspace (e.g., computer screen(s))—the innovation described herein provides this ability by way of the resource gathering component 106 and the rendering component 108 respectively. For example, when processing an LC (or other similar instrument), a single computing experience (e.g., workspace) can, by way of the trade services management display 112, display status for the particular LC (e.g., payment or setup). Another space (or panel) on the display 112 can display resources such as scanned images of actual collateral documents, for example shipping documents which are often used to prove that the buyer actually sent the goods that the buyer purchased. Yet another portion of the workspace (112) can be reserved for a snapshot into the history of the transaction. It is to be understood that the illustrated components (hardware, software and/or hardware & software) can be employed to effect these features, functions and benefits.

Figure 2:
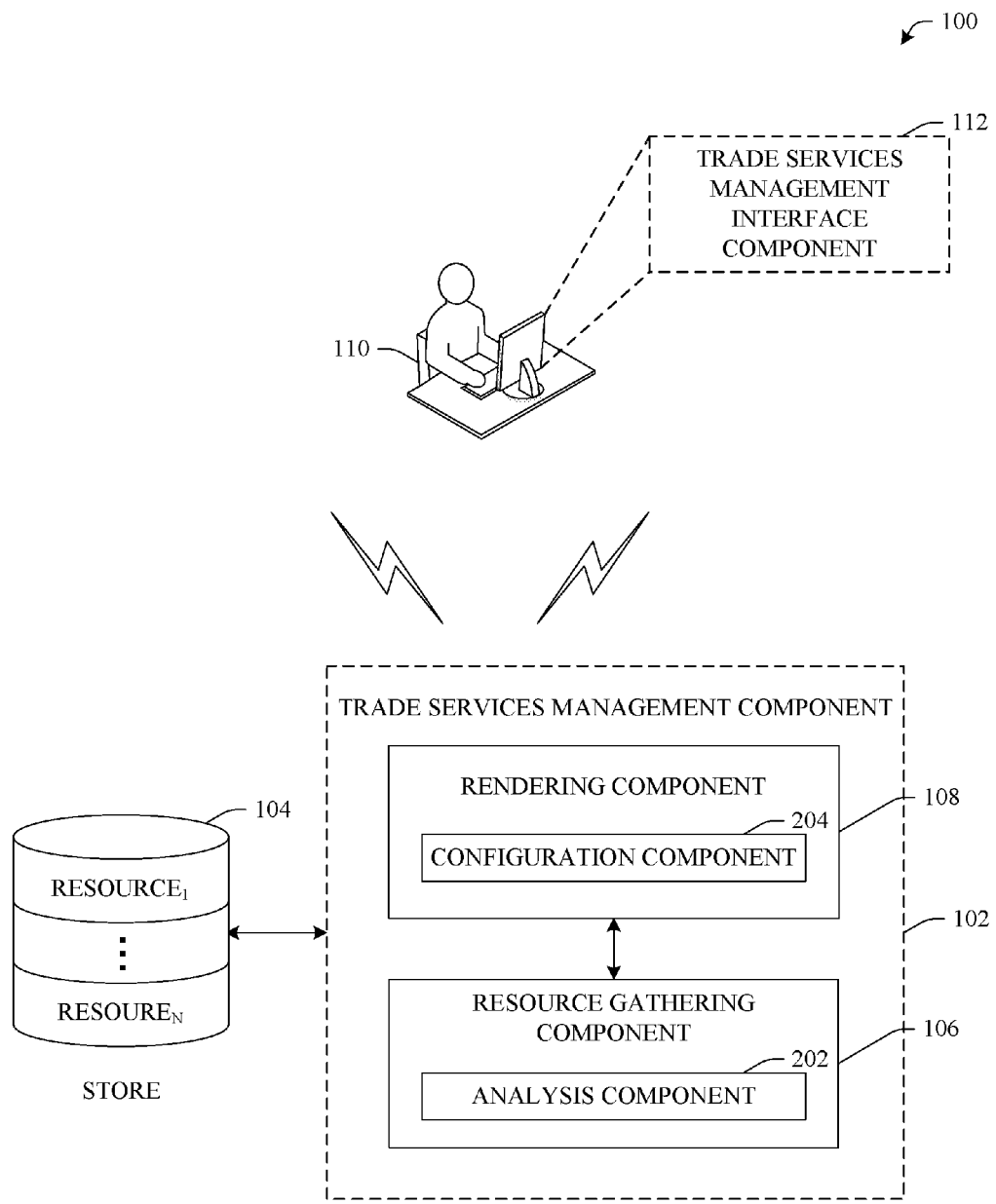
FIG. 2 illustrates an example block diagram of a system that employs an analysis component and a configuration component to facilitate trade services management in accordance with an aspect of the innovation.

Referring now to FIG. 2, an alternative block diagram of system 100 is illustrated. Generally, the alternative block diagram illustrated in FIG. 2 employs a resource gathering component 202 having an inclusive analysis component 202 and a rendering component 108 having an inclusive configuration component 204. The functionality of each of these sub-components will be described with reference to the figures that follow. Essentially, these sub-components (202, 204) facilitate analysis of a transaction to enable location/access of relevant resources and configuration of the relevant resources for presentation to a user 110 respectively.

The analysis component 202 can actively or dynamically monitor status of a transaction thereby enabling the resource gathering component 106 to locate, access or otherwise obtain resources from a store(s) 104. It will be understood that most any indexing, tagging or marking scheme can be employed to locate and/or access the resources associated with a transaction. In a specific example, the analysis component 202 can monitor status of an LC transaction. For example, the analysis component 106 can establish if products have been shipped, if a bill of lading has been sent (or received), if payment has been rendered (or received), etc. Accordingly, the resource gathering component 106 can retrieve information and images of relevant resources (e.g., documents) related to the transaction. This information can be provided to the rendering component 108 for arrangement, organization, formatting, etc. by the configuration component 204.

Figure 3:
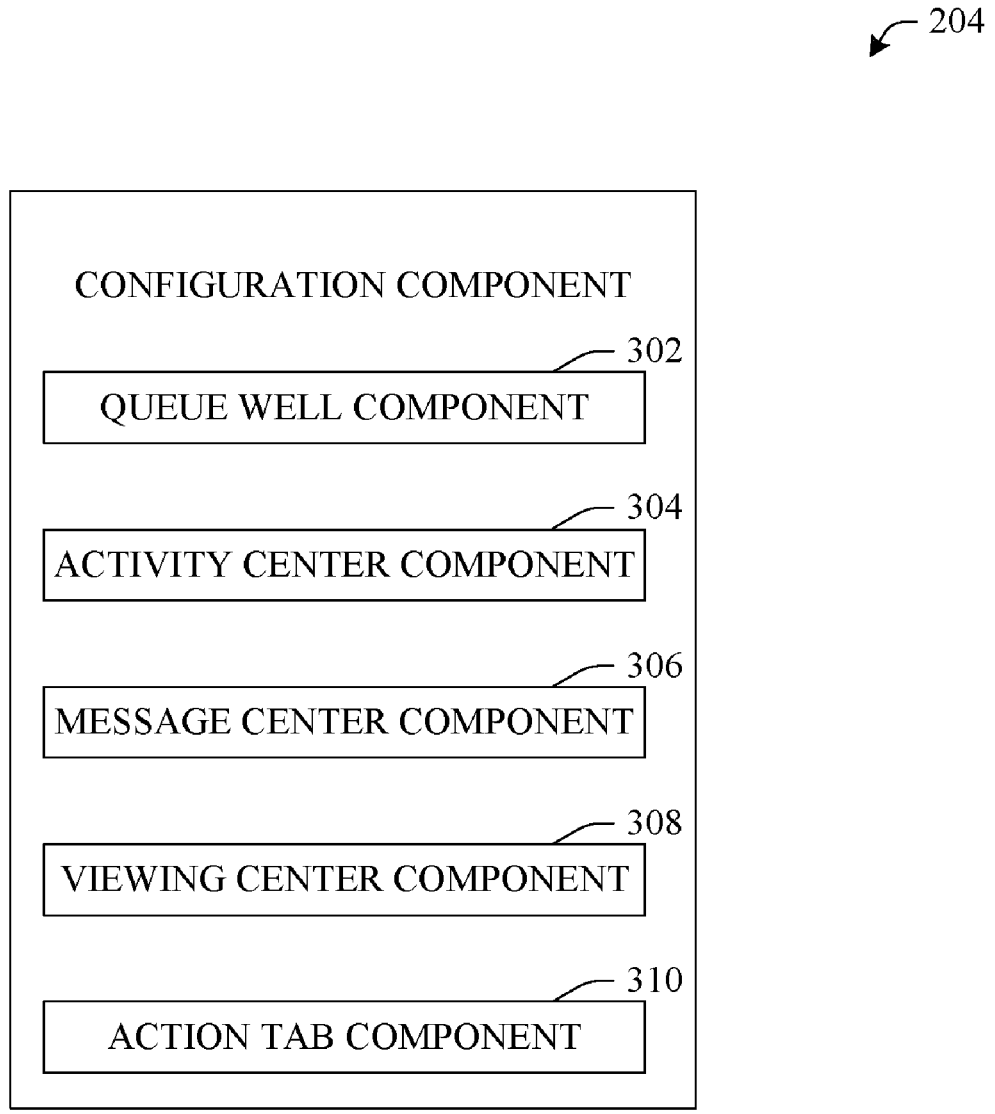
FIG. 3 illustrates an example block diagram of configuration component that facilitates generation of a Queue Well, an Activity Center panel, a Messaging Center panel, a Viewing Center panel and an Action Tab in accordance with aspects of the innovation.

FIG. 3 illustrates an example configuration component 204 in accordance with an aspect of the innovation. Generally, the configuration component 204 can include a queue well component 302, an activity center component 304, a message center component 306, a viewing center component 308 and/or an action tab component 310. Each of these sub-components (302-310) facilitate arrangement and/or configuration of resources and information for presentation (e.g., via trade services management display 112 of FIG. 1).

Following is a discussion of each of these sub-components (302, 310). A more detailed graphical representation of each of the sub-components is illustrated in the figures that follow. In accordance with the innovation, an Activity Center panel (established by way of the Activity Center component 304) drives the workspace. As well, the Activity Center panel can share a dynamic relationship to the Message Center (established by the message center component 306), which illustrates messages pertinent to the current transaction or related to workflow of the work being done. Additionally, the Activity Center panel provides access to the history (e.g., resources such as amendments, changes, other payments) related to the work being done. It is to be understood that the history in most often instrumental in assisting a clerk (e.g., 110 of FIG. 1) in processing the transaction within the Activity Center panel.

Essentially, the innovation provides the Activity Center panel which communicates with the Viewing Center panel (established by way of the Viewing Center component 308) and can dynamically reach out to the Message Center panel. As well, the innovation provides comprehensive and real-time navigation among these components. At its basic level, the innovation is a factory floor processing system in that it systematically (and dynamically) corresponds with the workflow associated with transactions (e.g., LC transactions). In other words, the innovation employs a workflow work-queue structure whereby the system controls the workflow and enables delegation of the work to clerks on the processing floor. In doing so, the innovation employs a navigation bar or Queue Well (QW) (established by the Queue Well component 302) which provides ready access to the queue information within a single page display.

As will be better understood upon a review of the figures that follow, the QW can provide a snapshot of items or resources relevant to clerk's workload. In particular, the QW can provide the amount of work for a particular operator or clerk as well as the amount of work for a particular group at-large. For example, a slider bar (or other scrolling display or mechanism) can illustrate items within the queue together with those 'on deck,' etc. Additionally, this QW is a live (e.g., dynamic, real-time) interactive mechanism whereby an operator can link directly to items from the QW. For example, an operator can double-click on an item thereby launching the item within the Activity Center panel.

Still further, the QW can provide indication of items that are reaching an urgent (or alert) state under Service Level Agreement (SLA) standards. Essentially, QW provides an operator with a powerful information display which assists in workflow and work-queue management to increase productivity and prioritization. Effectively, the innovation provides the ability to effect easy and powerful navigation from the working area to the collateral information area as well as the ability to move among transactions onto the same panel.

Figure 4:
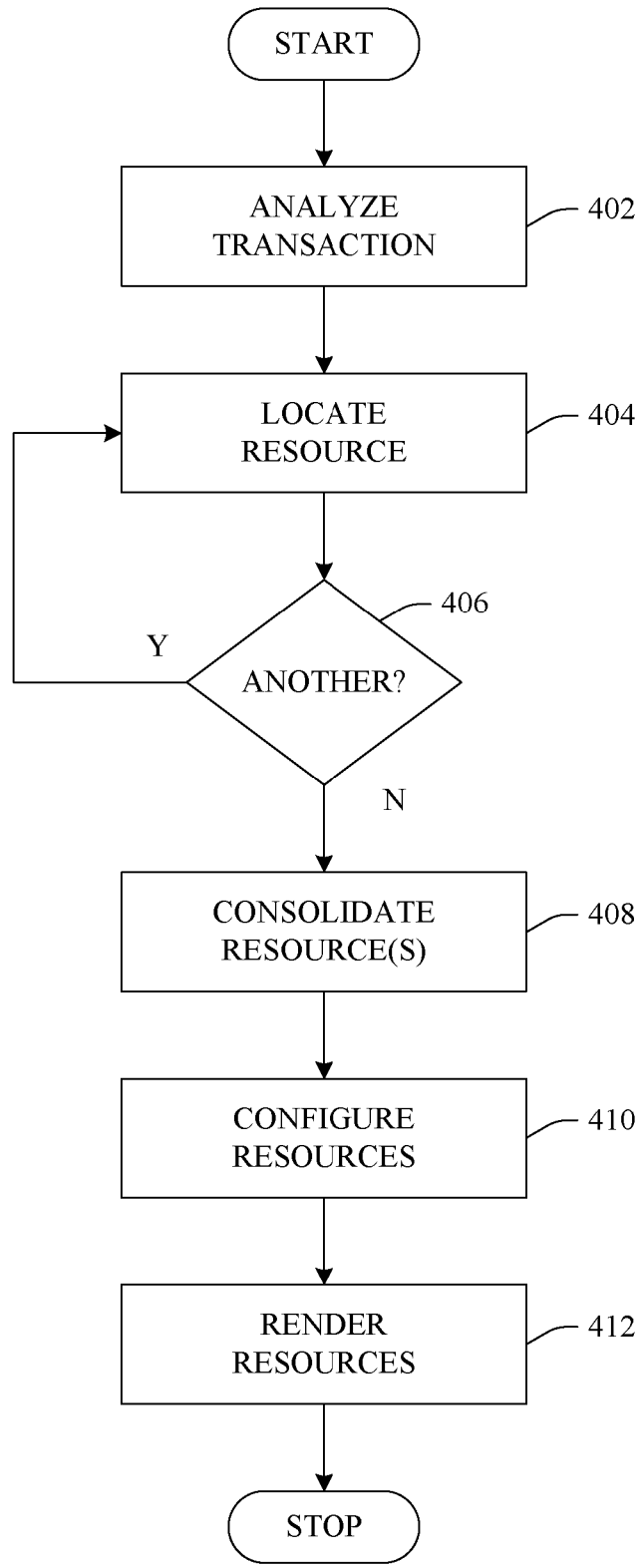
FIG. 4 illustrates an example flow diagram of procedures of consolidating and rendering resources associated with a transaction in accordance with an aspect of the innovation.

FIG. 4 illustrates a methodology of accessing and presenting transaction resources and status in accordance with an aspect of the innovation. While, for purposes of simplicity of explanation, the methodology shown herein, e.g., in the form of a flow chart, is shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 402, a transaction is analyzed. For example, the workflow and status of an LC transaction can be analyzed. Here, resources can be identified which are relevant to the LC transaction. The identified resources can be located at 404, for example, from a local store/source, remote store/source, third-party server, etc. As described above, the resources can be most any related or relevant information or data associated to a subject transaction. For instance, the terms and conditions of an LC transaction can be useful in identifying and locating related or relevant information (e.g., status, amount of payment, bill of lading, shipment notifications . . . ).

A determination is made at 406 to establish if an additional resource is to be located and/or retrieved. If so, the methodology returns to 404 to locate the next resource. It is to be understood that multiple resources can be retrieved from multiple sources in accordance with the innovation. Additionally, it is to be understood that the methodology of FIG. 4 is recursive in that it can represent a on-going, real-time, dynamic monitoring of a transaction (e.g., an LC transaction).

Resources can be consolidated at 408. At 410, the resources can be configured for display to a user. For example, a QW can be updated to reflect current status of a transaction. Similarly, the Activity Center, Message Center and/or Viewing Center can be configured to convey information to a user. The configured information can be rendered to a user at 412. As will be shown in accordance with the figures that follow, the information can be displayed in specific screen or page displays. As well, specific areas of a page or screen can be designated for presentation of information to a user. It is to be understood that the example page displays that follow are included to add perspective to the innovation and are not intended to limit the innovation in any manner.

Figure 5:
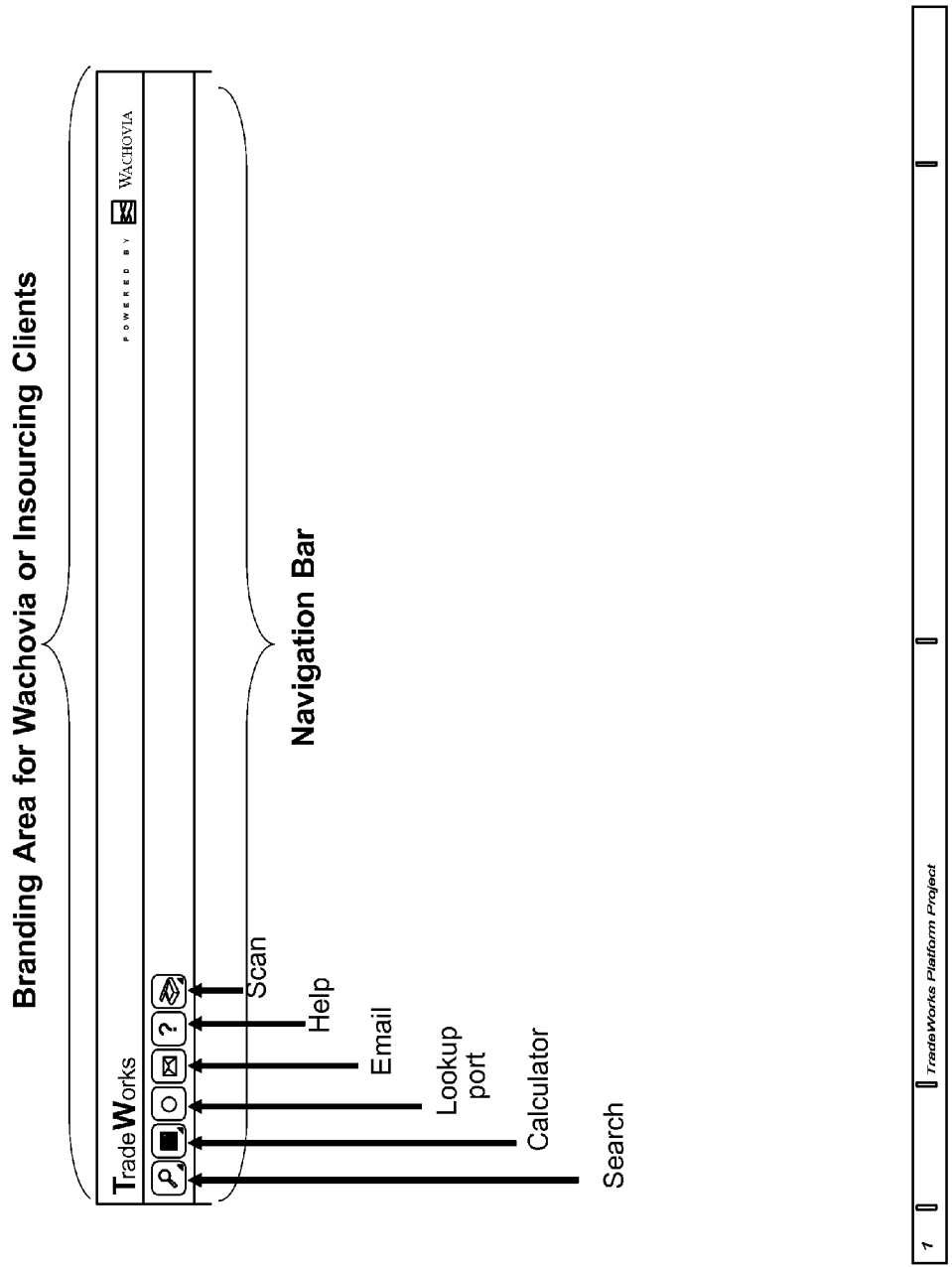
FIG. 5 illustrates an example Navigation Bar in accordance with an aspect of the innovation.
Figure 6:
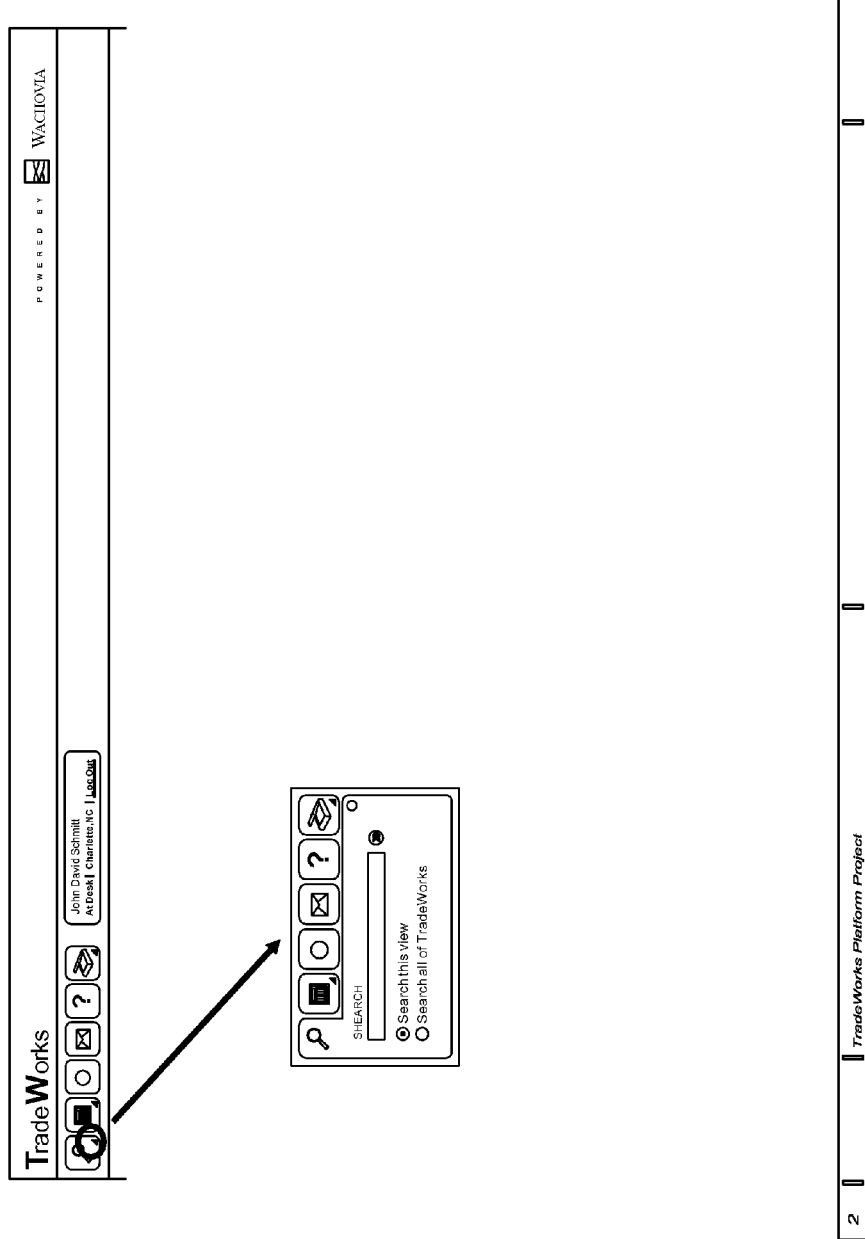
FIG. 6 illustrates example 'chicklet' functionality associated with the example Navigation Bar in accordance with an aspect of the innovation.

FIG. 5 illustrates an example Navigation Bar in accordance with an aspect of the innovation. Essentially, the Navigation Bar can employ 'chicklets' and buttons to launch navigation within the system or application. These global tools (e.g., buttons) can enable efficient access to a range of utilities in accordance with the innovation. Additionally, the navigation tools can be context and/or entitlement sensitive as desired or appropriate. As will be understood, most any navigation technology known in the art can be employed in connection with the innovation to assist in navigational techniques. FIG. 6 illustrates additional detail regarding the 'chicklets.' For example, to search, by clicking on the triangle, a user can specify if the request is associated with the task or event. Alternatively, the user can specify if the search is to be conducted across a system, network or collection of sources.

Figure 7:
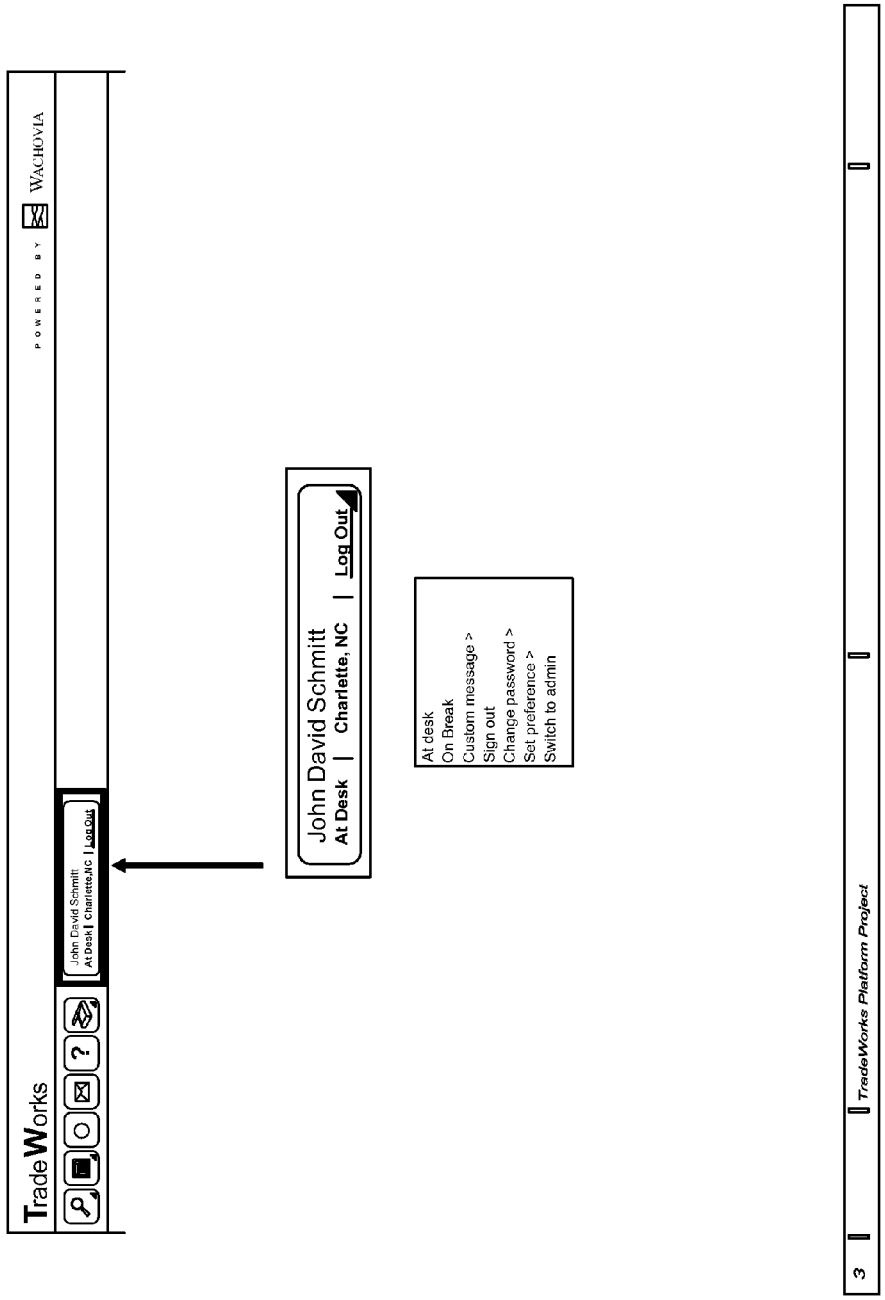
FIG. 7 illustrates additional example functionality of the Navigation Bar in accordance with an aspect of the innovation.

FIG. 7 illustrates example Navigation Bar functionality in accordance with an example embodiment. For example, the Navigation Bar can illustrate identity information, an ability to logout, among others. As shown, the bar can illustrate a local user name and status. By clicking on the triangle, a user can set a status indicator. Additionally, administrators (or other authorized users) can switch to maintenance mode. FIG. 7 illustrates examples of a status indicator and other entitlement tools in accordance with aspects of the innovation.

Figure 8:
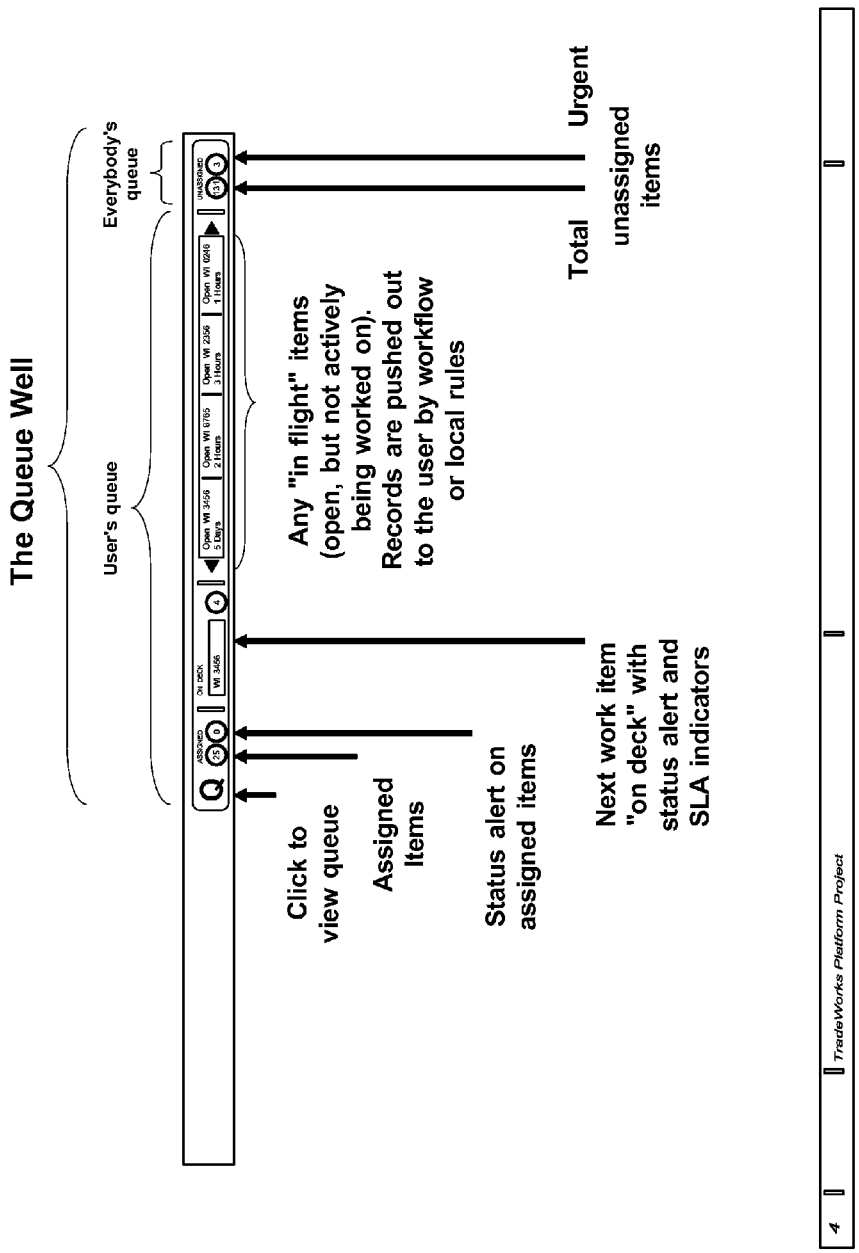
FIG. 8 illustrates an example Queue Well in accordance with an aspect of the innovation.

FIG. 8 illustrates an example QW in accordance with an aspect of the innovation. As shown, the QW can include a button with a capital 'Q' (or other designation) which provides a quick and easy navigation to access a detailed list of the items in the queue. The assigned items and the status alert are those items assigned to the subject operator (or clerk) as well as those items with an escalated status (e.g., alert status). The QW can also include an indicator that illustrates the subsequent item that is 'on deck' in the subject operator's assigned items.

As illustrated in the example, a slider bar (e.g., scrolling display) of the QW illustrates those items that are 'in-flight.' In other words, the 'in-flight' list provides a quick look and a quick access to items within the in-box. Here, for example, an operator or user can double-click on any of the items thereby launching the item, for example, within the Activity Center panel. As well, the operator can scroll through the 'in-flight' transactional items by utilizing the navigational arrows on either side of the slider bar, by hovering above an item with a navigation device, or other suitable manner.

As shown, detail regarding the items can be included within the slider bar. For instance, in the example of FIG. 8, a countdown to the SLA due date is shown for each item—which assists in workload management and prioritization. Other examples can provide an aging parameter—again which can assist an operator in workload management and prioritization.

The example of FIG. 8 can also include an indicator of everyone's queue. In other words, the complete work (at-large) group queue can be indicated together with applicable alerts. In the example shown, a number of unassigned items are illustrated. As can be understood, this QW is a powerful tool for supervisors to be able to reassign work in order to meet or exceed SLA requirements. In one example (not shown), a supervisor can employ a management version (with appropriate authorization credentials) of the QW whereby they can monitor the QW of everyone within a group thereby, prompting workload reassignment as necessary or appropriate.

Figure 9:
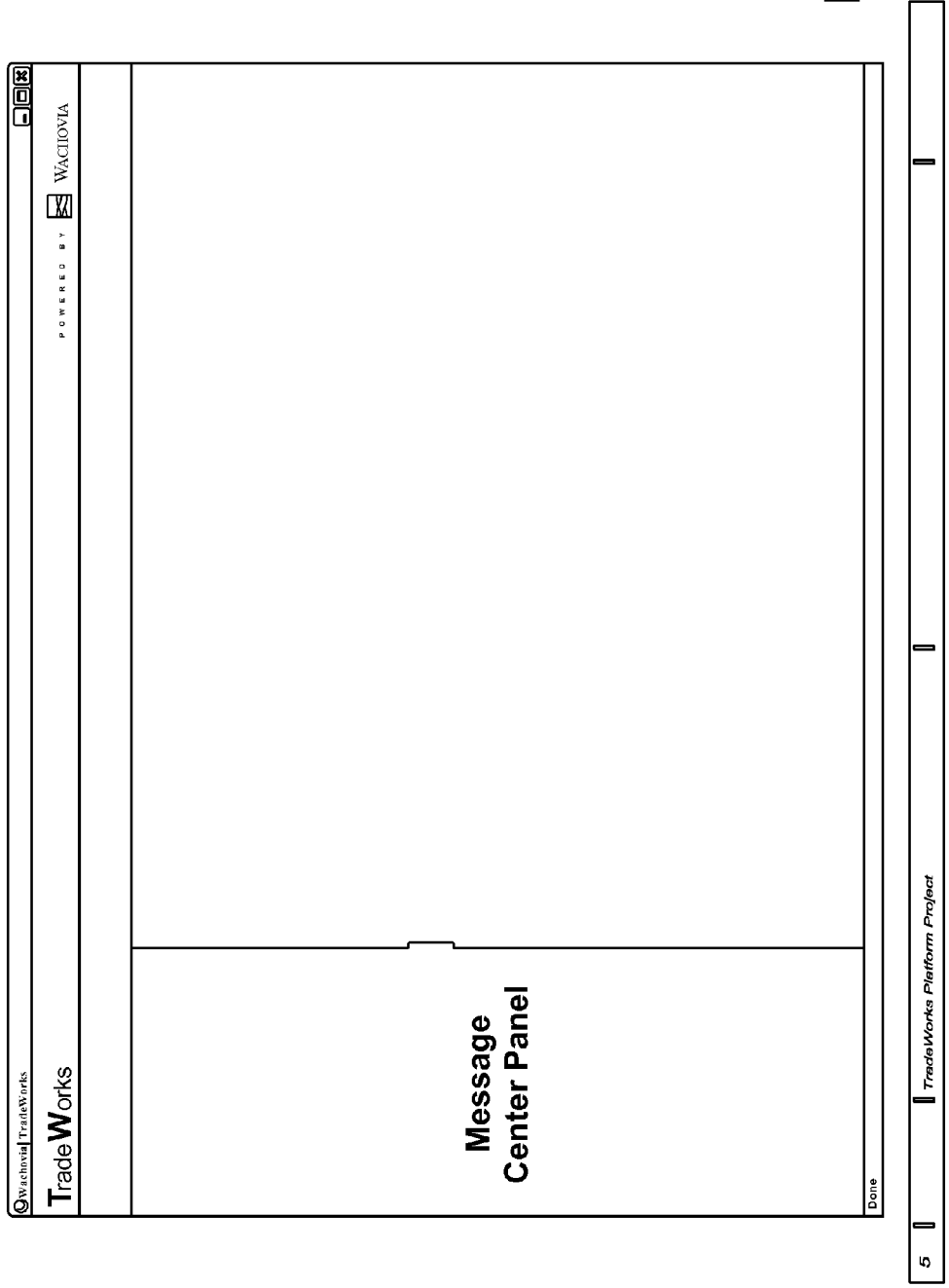
FIG. 9 illustrates example placement of a Message Center panel in accordance with an aspect of the innovation.
Figure 10:
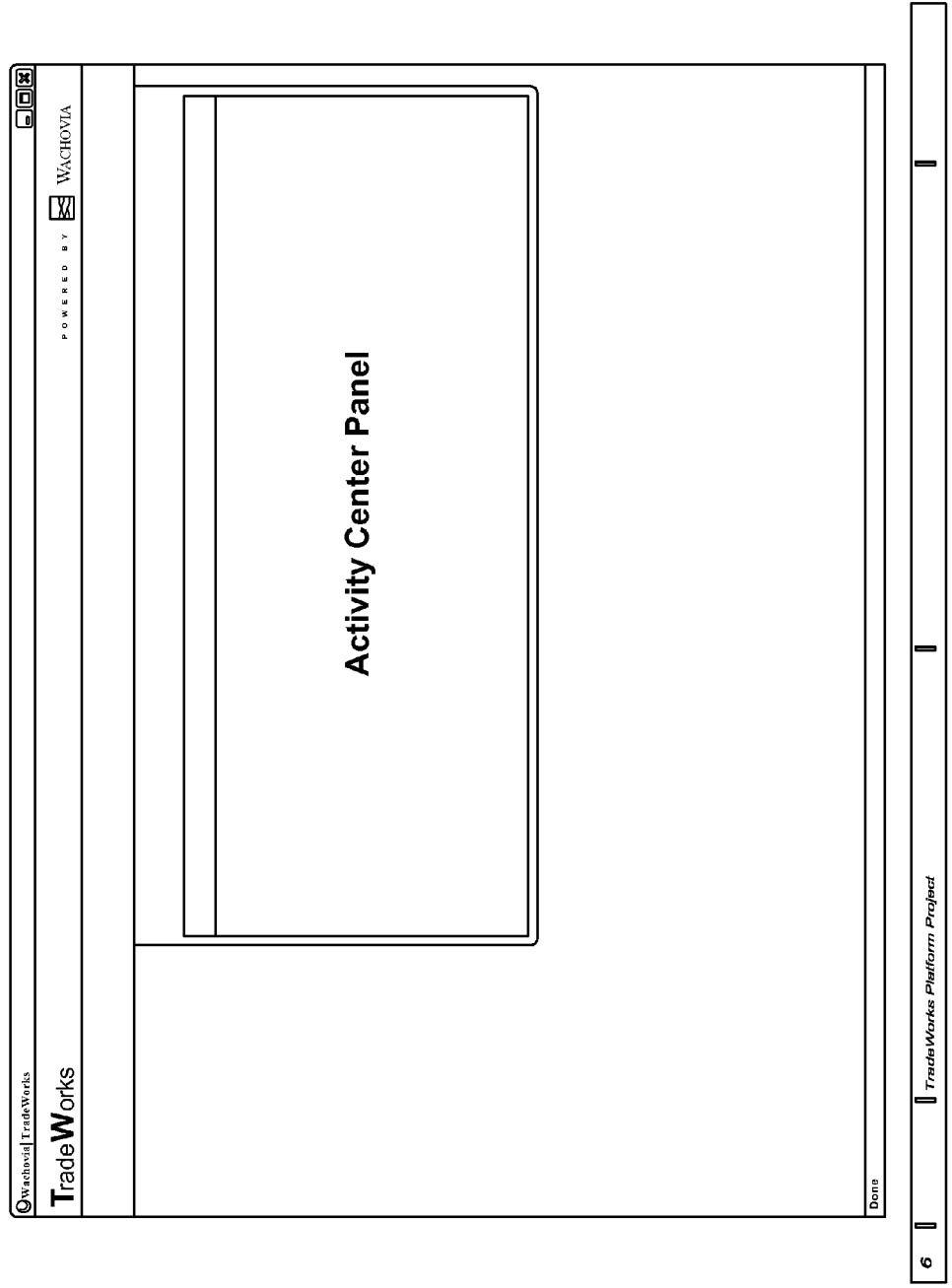
FIG. 10 illustrates example placement of an Activity Center panel in accordance with an aspect of the innovation.
Figure 11:
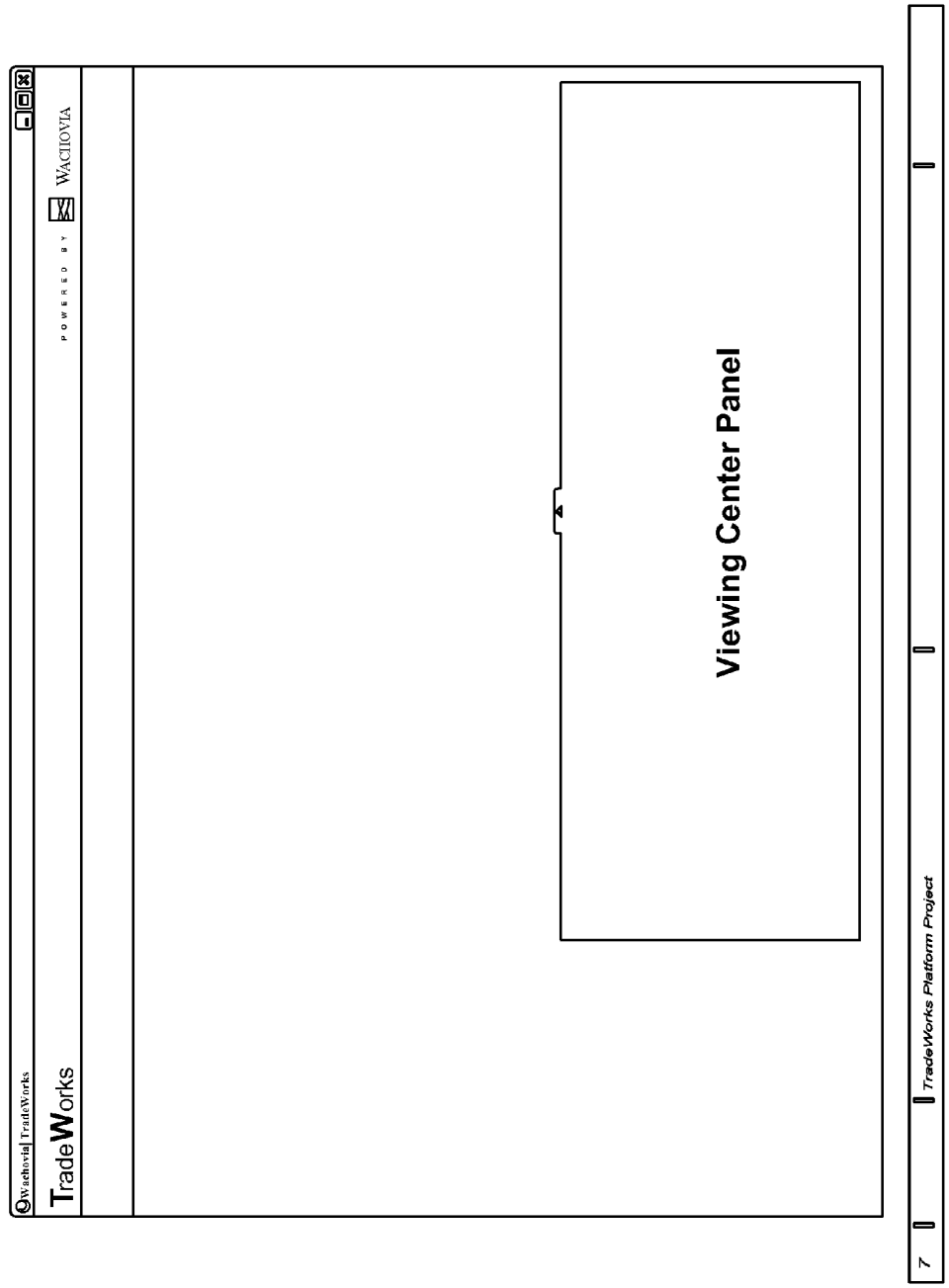
FIG. 11 illustrates example placement of a Viewing Center panel in accordance with an aspect of the innovation.

FIGS. 9, 10 and 11 illustrate example placement of various control pieces within a single screen display. For example, FIG. 8 illustrates the Message Center panel (e.g., access to messages or other transaction detail) along the left vertical of the screen. FIG. 10 illustrates example placement of the Activity Center panel in the upper right portion of the screen. Finally, FIG. 11 illustrates example placement of the Viewing Center panel in the lower right portion of the screen. While specific placement is shown, it is to be understood that these placements are included to provide perspective to the innovation and are not intended to limit the innovation in any manner. Similarly, it is to be understood that each portion of the screen can be expandable or retractable as desired by click-drag techniques or the like. Accordingly, it is to be understood that other example page configurations exist which are to be included within the scope of the innovation and claims appended hereto.

Figure 12:
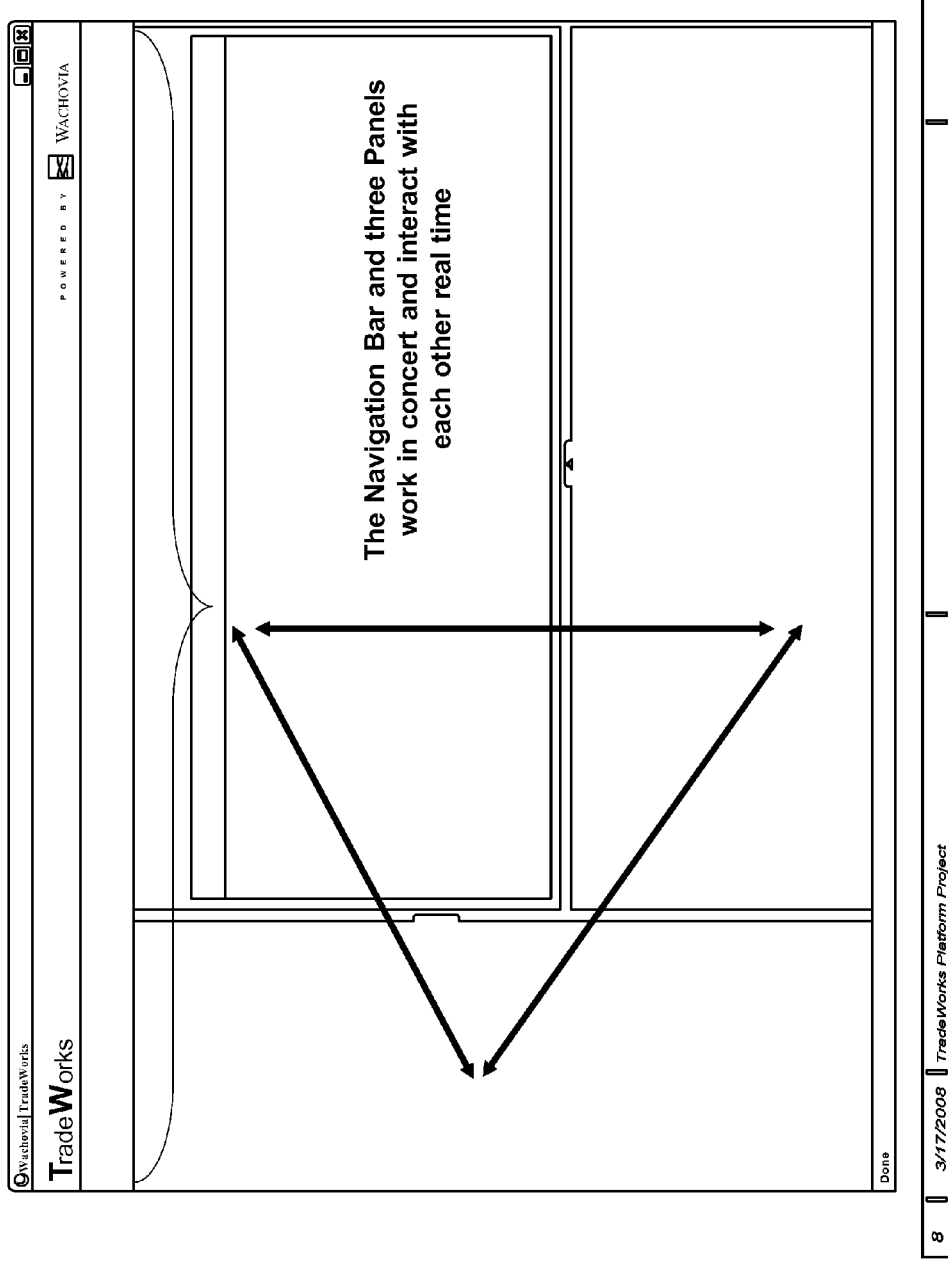
FIG. 12 illustrates example real-time interactivity between the individual portions of the single-page display in accordance with aspects.

FIG. 12 is included to illustrate the real-time interactivity between the individual portions of the single-page display in accordance with aspects of the innovation. In other words, FIG. 12 illustrates that the QW, Message Center panel, Activity Center panel and Viewing Center panel can all work in concert, in real-time, according to a particular trade services transaction (e.g., LC).

Thus, the innovation provides for an operator to see status and to move to different transaction via the navigation bar. As well, when in a transaction, a user can drill down into the transaction, e.g., via the Viewing Center panel for images, Message Center panel for pertinent messages or additional detail about the transaction.

Figure 13:
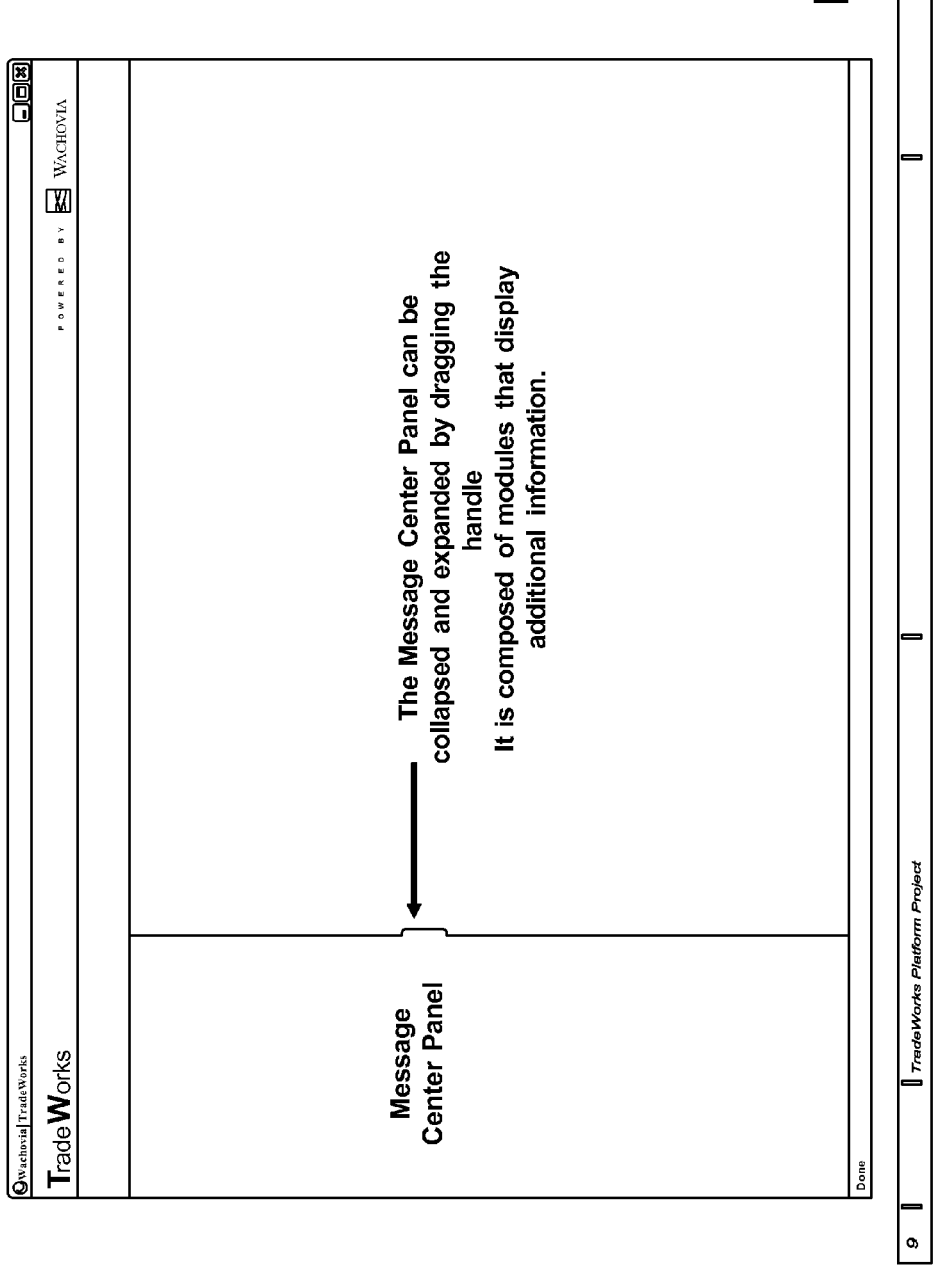
FIG. 13 illustrates behavior advantages in accordance with an aspect of the innovation.
Figure 14:
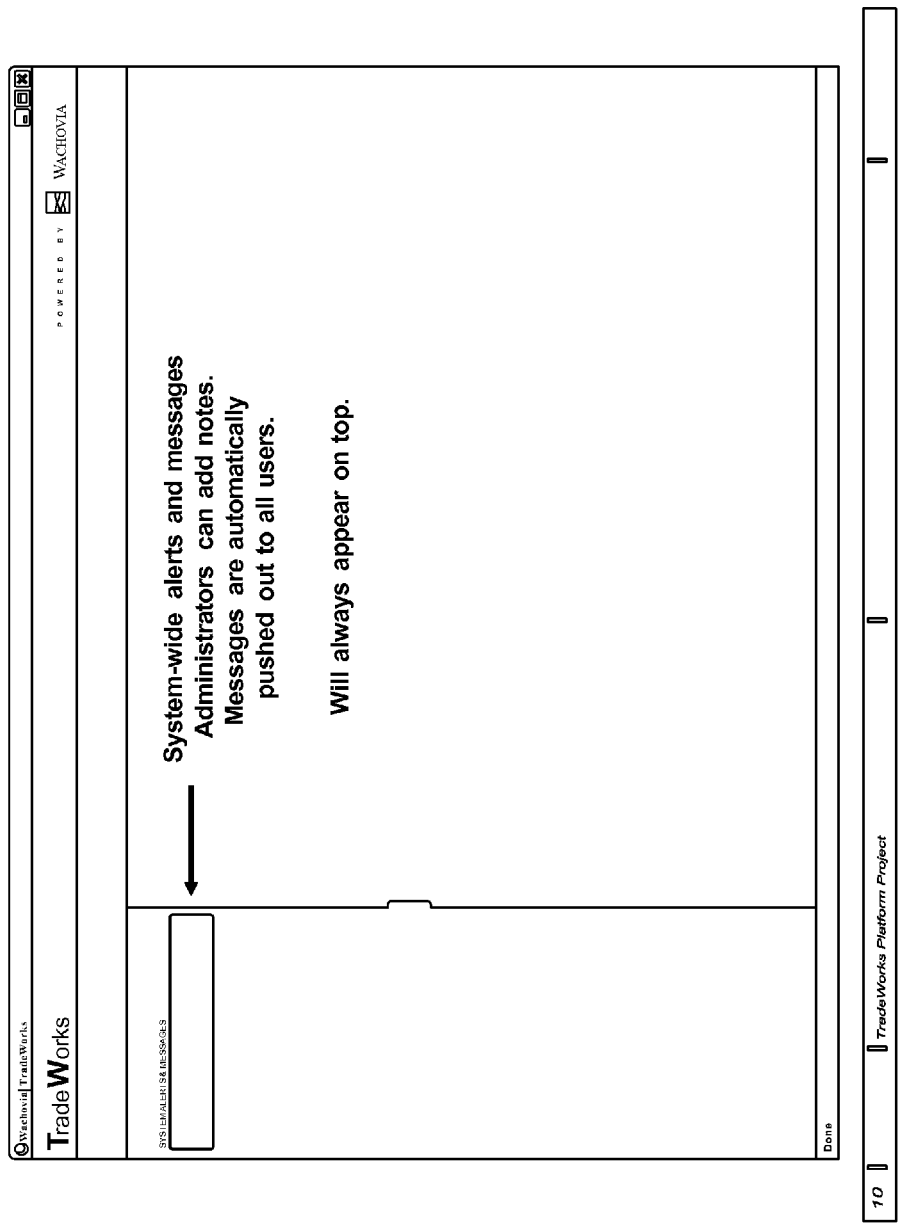
FIG. 14 illustrates behavior advantages in accordance with an aspect of the innovation.
Figure 15:
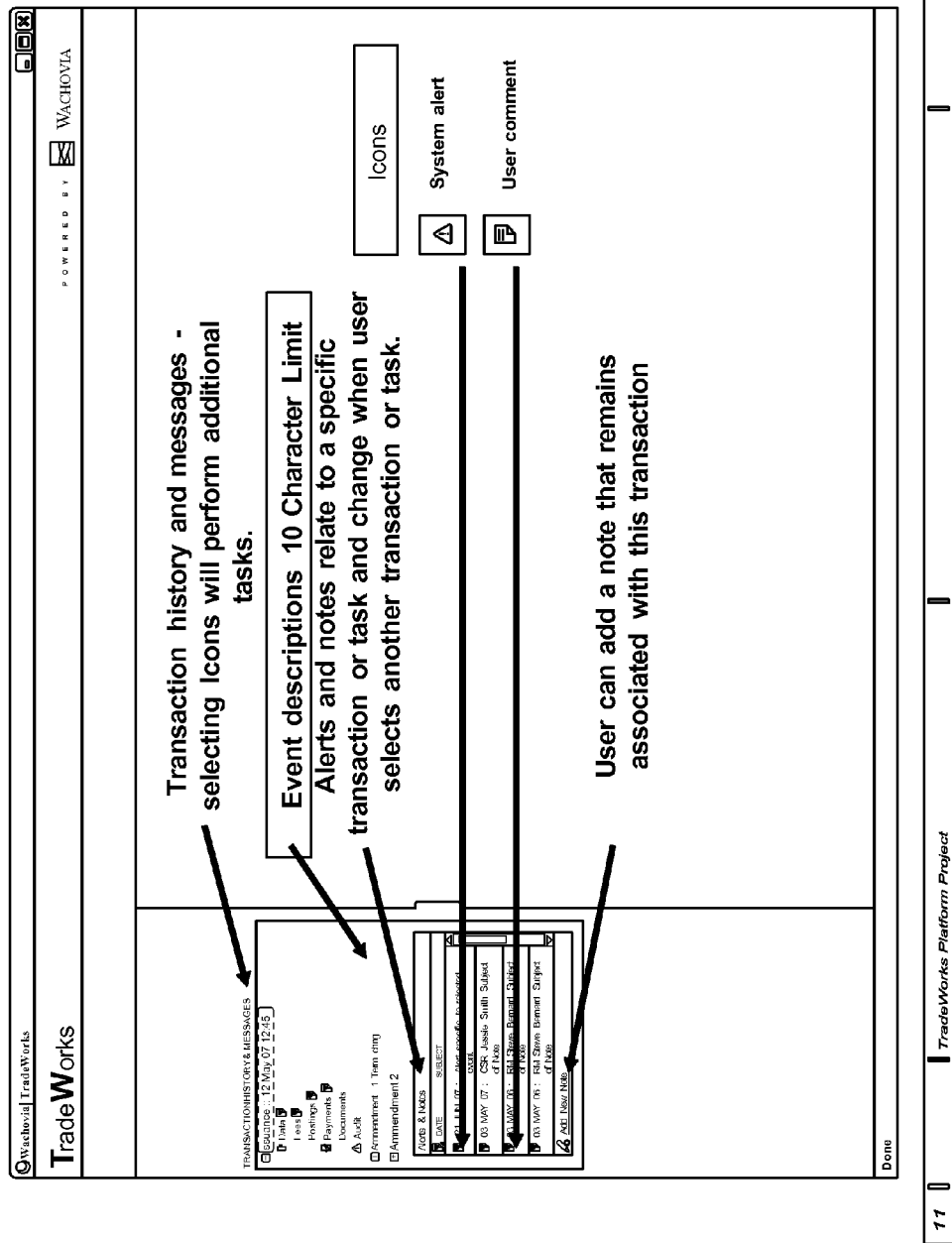
FIG. 15 a snapshot of the transaction history in accordance with an embodiment.

FIGS. 13, 14 and 15 illustrate example behavioral advantages of the system in accordance with aspects. For example, FIG. 13 illustrates the collapse- and expandability of the message center panel. In particular, the panel can be collapsed and expanded, as desired, by dragging the handle with a navigation device. FIG. 14 illustrates that the Message Center panel can display system-wide alerts and messages. Additionally, administrators can add notes and messages can be automatically pushed to users as desired. In aspects, the window can be set to always appear on top thereby enhancing effectiveness of the feature.

FIG. 15 illustrates a snapshot of a transaction history in accordance with an embodiment of the innovation. More particularly, an operator can view messages about a transaction such as, data, fees, general ledger postings, income created, payments made, changes, amendments, etc. which are related to a particular transaction. As illustrated, events can have descriptions, for example 10 character limit. The screen can display alerts and notes which relate to a specific transaction or task. Accordingly, the alerts and notes can dynamically change when a user selects a different transaction or task. Additionally, notes can be added which remain associated with a subject transaction.

Figure 16:
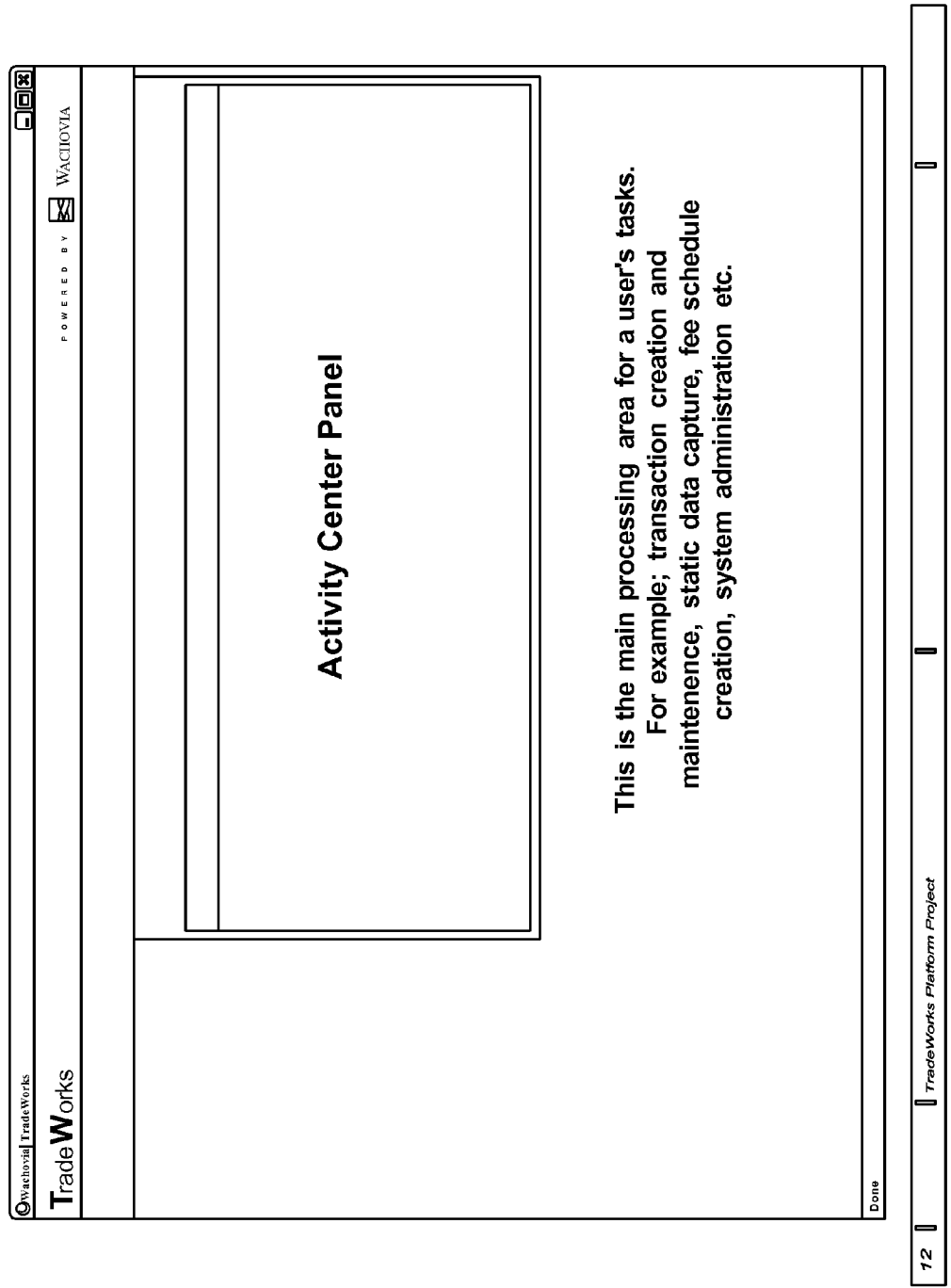
FIG. 16 illustrates behavior information regarding the Activity Center panel in accordance with aspects of the innovation.

FIG. 16 illustrates behavioral information regarding the Activity Center panel in accordance with aspects of the innovation. As described supra, the Activity Center panel is the main processing area for a user's or clerk's tasks. For instance, the Activity Center panel can facilitate transaction creation and maintenance, static data capture, fee schedule creation, system administration, etc. Essentially, whatever business process is on the screen, each section automatically conforms to the particular business process, e.g., in real-time.

Figure 17:
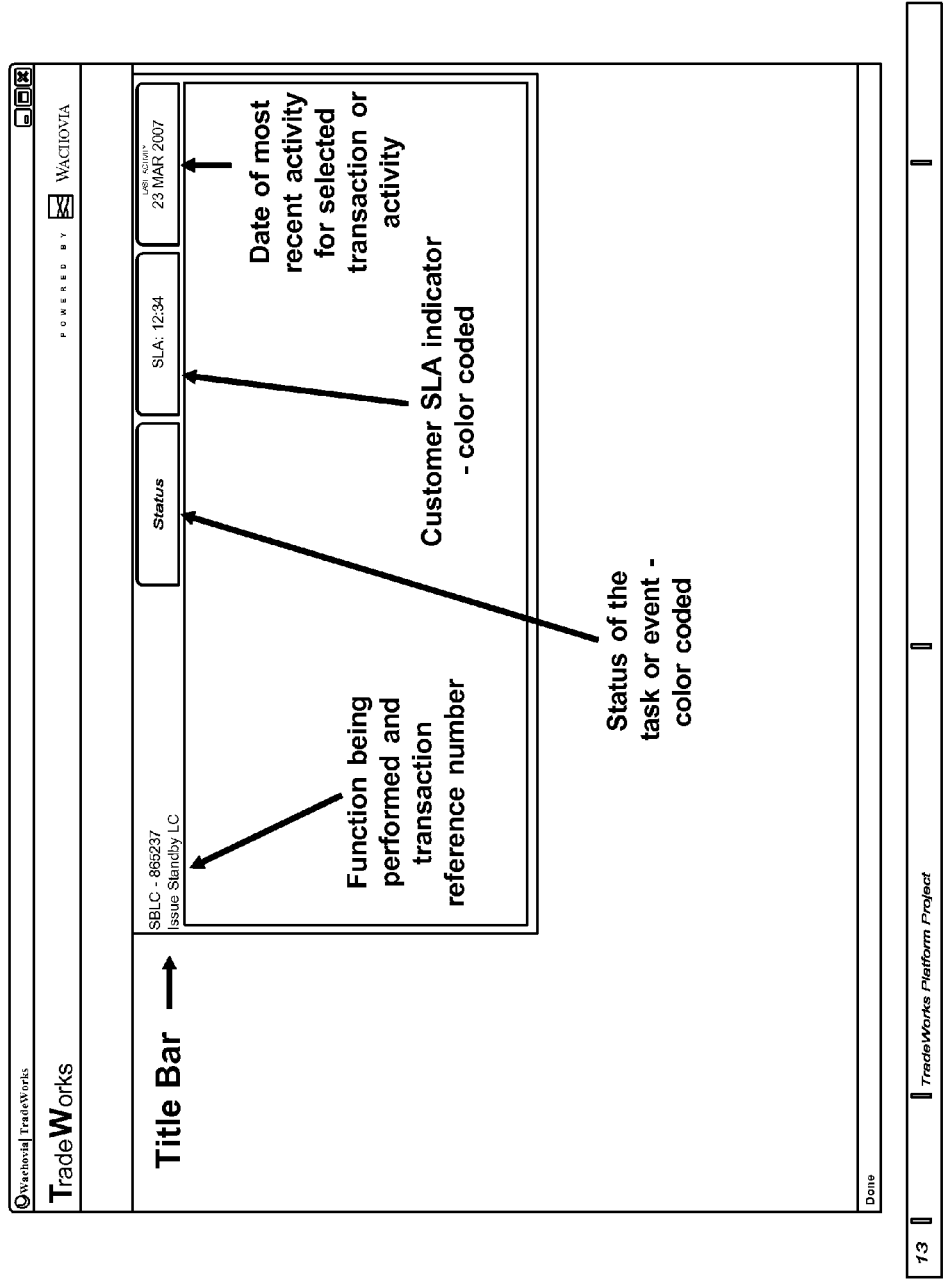
FIG. 17 illustrates positioning of and mechanisms to manipulate data with the Activity Center Panel.
Figure 18:
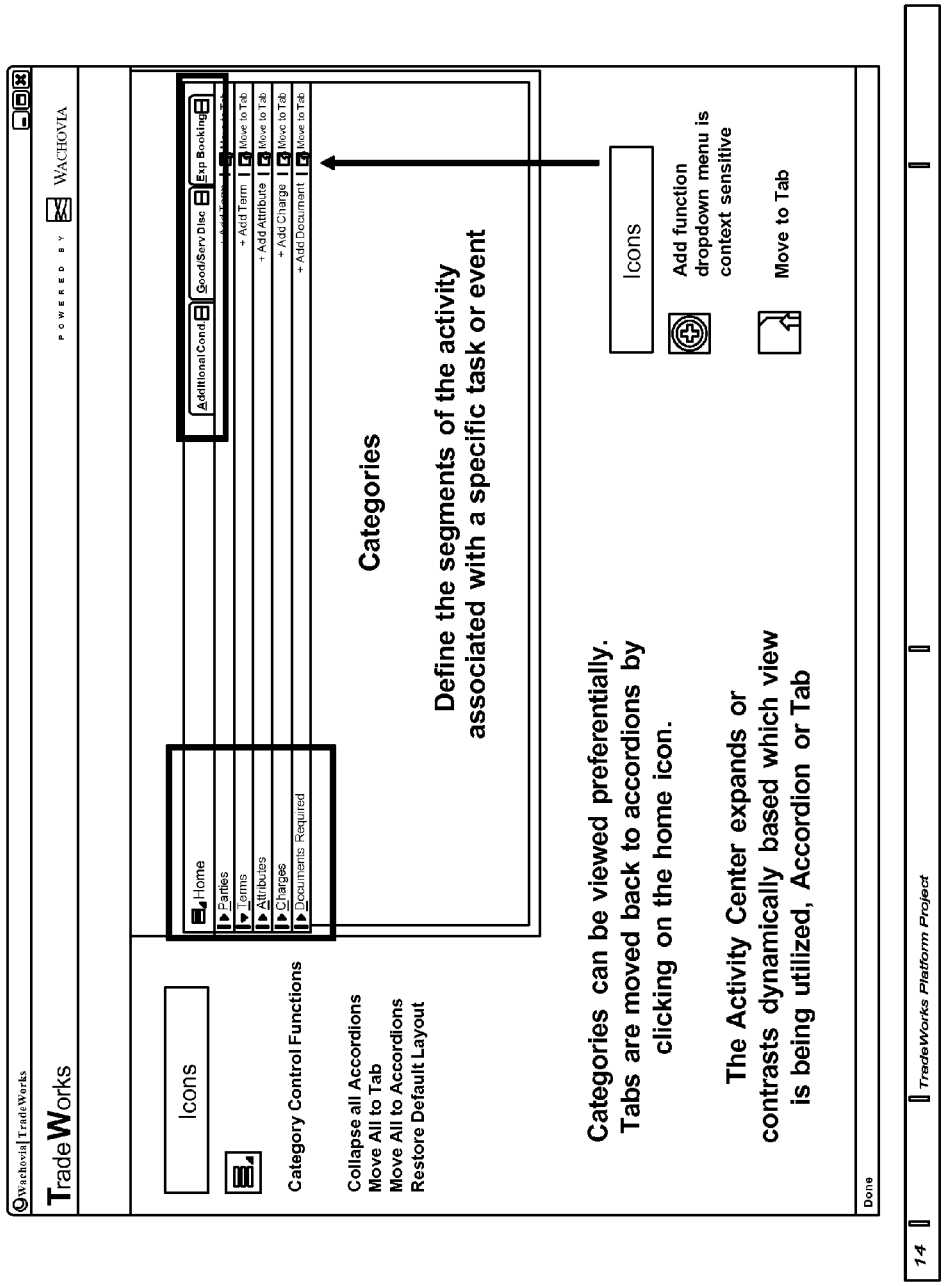
FIG. 18 illustrates positioning of and mechanisms to manipulate data with the Activity Center Panel.
Figure 19:
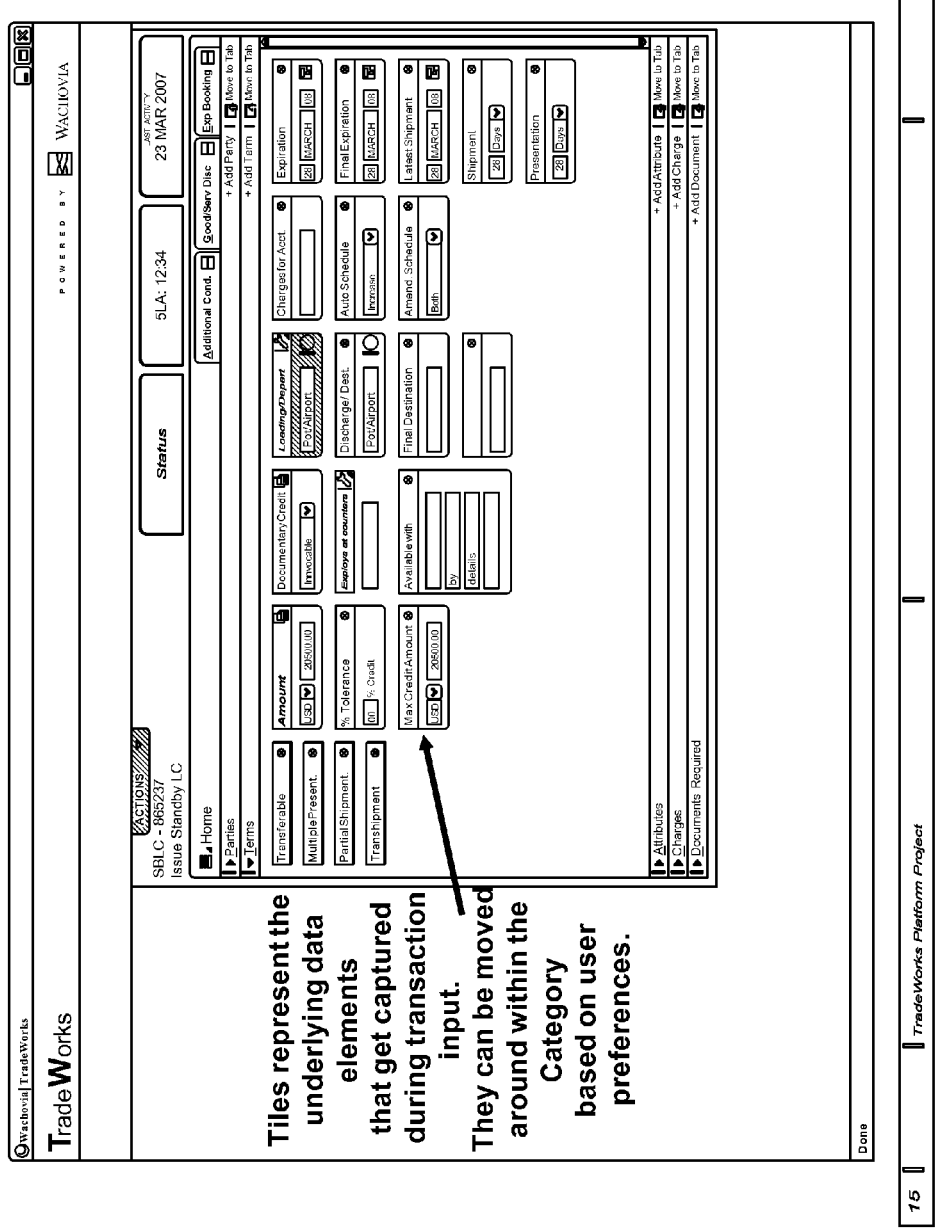
FIG. 19 illustrates positioning of and mechanisms to manipulate data with the Activity Center Panel.

FIGS. 17, 18 and 19 illustrate positioning of data and mechanisms to manipulate data within an example Activity Center panel. FIG. 17 illustrates that the Activity Center panel can display a title bar having information related to a function being performed as well as transaction reference number. The status field can display status of a task or event. As well, in aspects, the status can be highlighted, color-coded, emphasized or de-emphasized as desired or appropriate. Similarly, a customer SLA indicator can be color-coded, emphasized or de-emphasized as desired or appropriate. The field can display the date of the most recent activity for a selected transaction or activity.

FIG. 18 illustrates that the Activity Center panel can display categories associated with a particular transaction or task. Essentially, the categories can define the segments of a particular activity associated with a specific task or event. Categories can be viewed preferentially. Items can be expanded in an accordion-type manner as shown in order to drill into more detail as desired.

Figure 20:
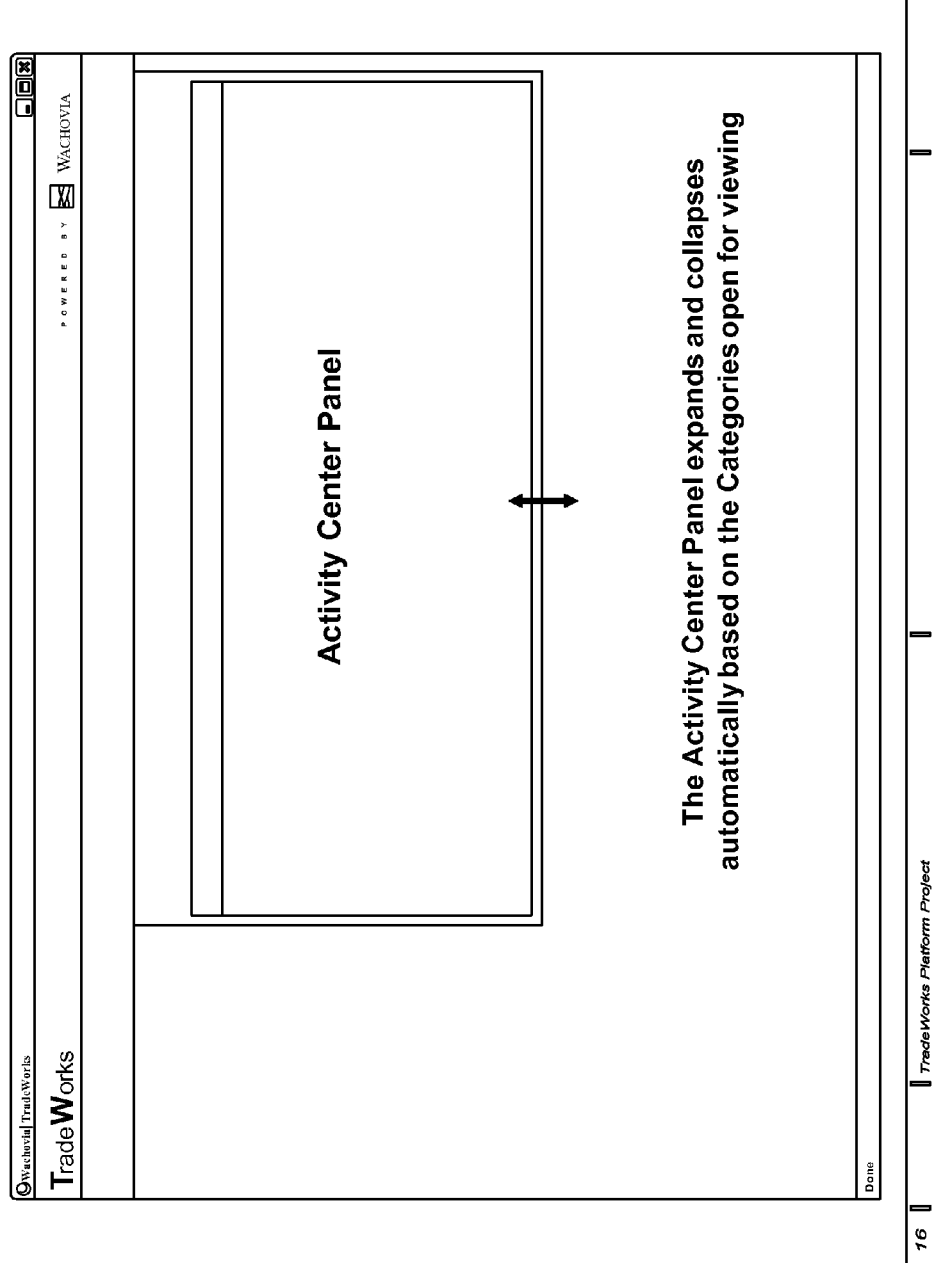
FIG. 20 illustrates expand and collapse functionality of the Activity Center panel in accordance with an aspect of the innovation.

FIG. 19 illustrates tiles that represent underlying data elements that get captured during transaction input. These tiles can be moved around within the category based upon user preference or other appropriate preference, rule, inference or policy. FIG. 20 shows that the Activity Center panel can expand and collapse as desired, for example, by clicking and dragging a tab or other suitable mechanism.

Figure 21:
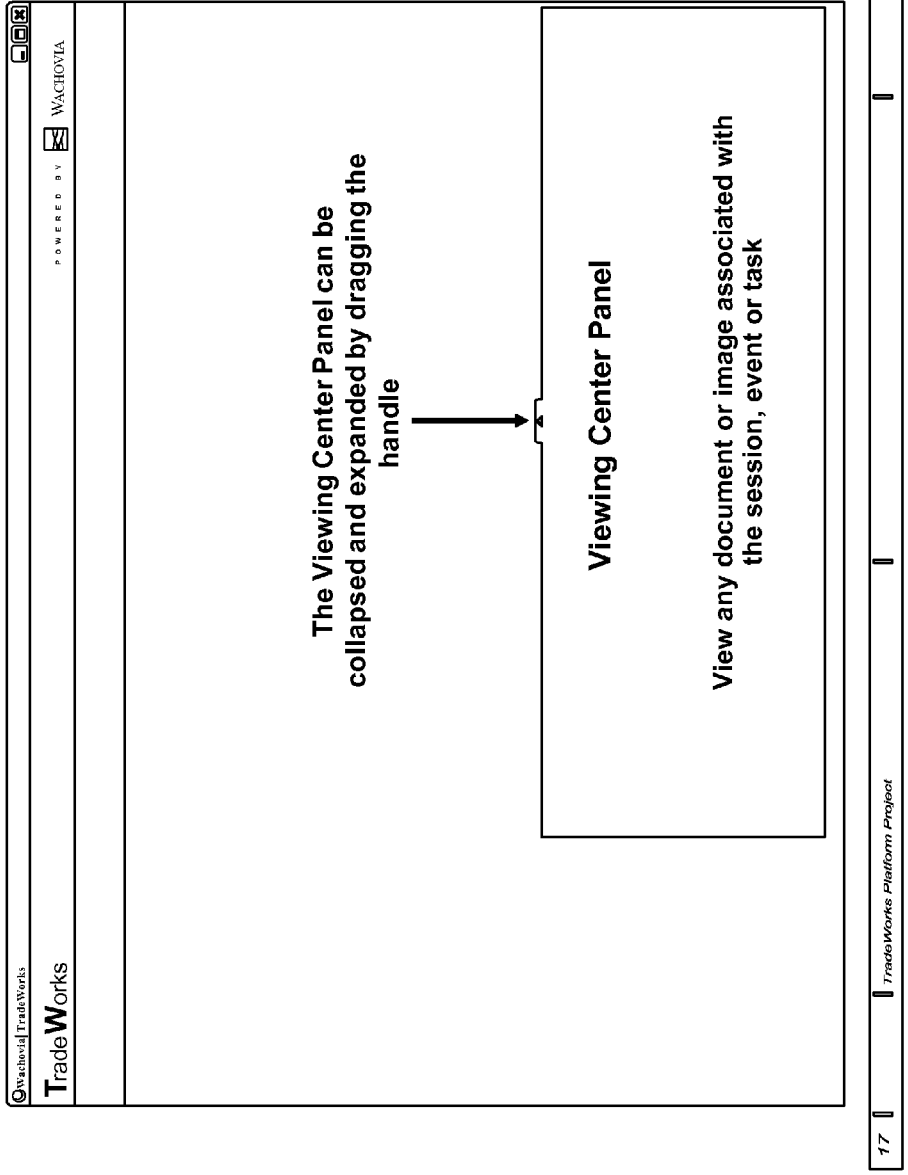
FIG. 21 illustrates features of the Viewing Center Panel in accordance with aspects of the innovation.

FIG. 21 describes some features of the Viewing Center panel in accordance with aspects. For instance, the Viewing Center panel can be collapsed and/or expanded by dragging the handle, for example by way of a navigation device. As described supra, the viewing panel can enable a user to view most any resource (e.g., document or image) associated with a session, event or task.

Figure 22:
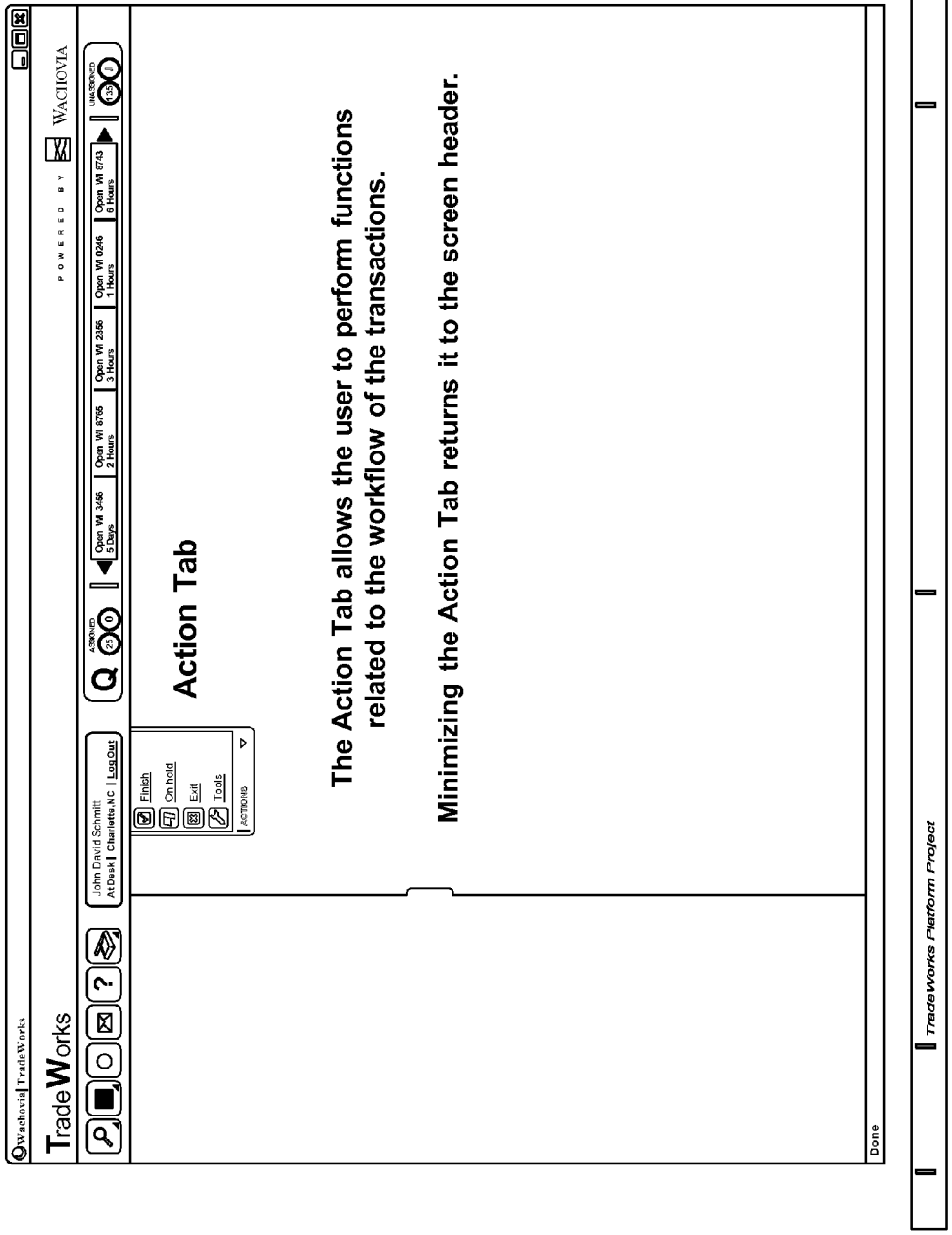
FIG. 22 illustrates an 'action tab' which is a floating box that facilitates access to closing out the work currently in the Activity Center panel.
Figure 23:
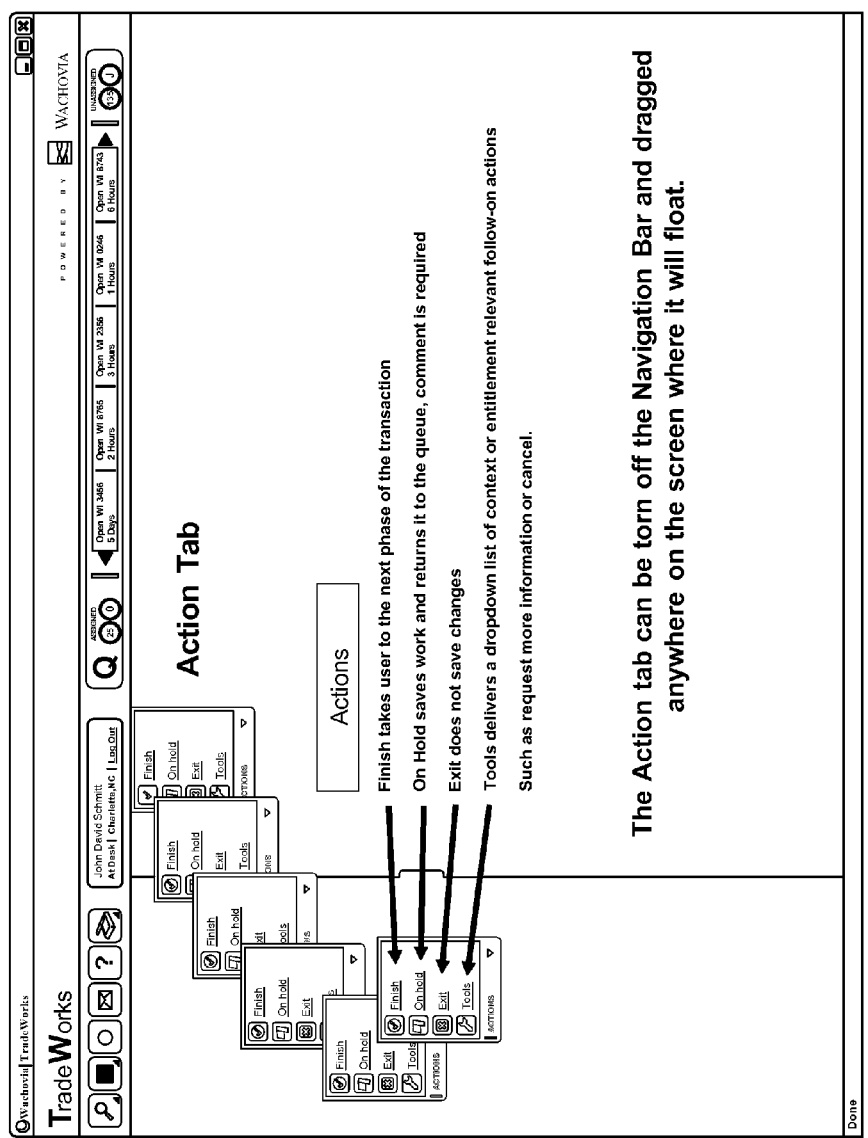
FIG. 23 illustrates the floating functionality of the Action Tab in accordance with an aspect of the innovation.

FIG. 22 illustrates an example 'action tab' which can be a floating box (or other shaped control) that facilitates access to managing (e.g., closing out) the work currently in the Activity Center panel. For example, as shown, in one example, the operator can 'Finish' work, put work 'On-Hold' or 'Exit' without saving the work (e.g., abandon). It is to be appreciated that this floating action tab can include more or less action controls as desired or appropriate. The 'floating' functionality of the action tab is shown in FIG. 23. It is to be understood that minimizing the Action Tab can return it to the screen header whereby a user can launch as desired.

As shown in FIG. 23, 'finish' can move a user to a next phase of a transaction. 'On hold' can save work and return to the queue. 'Exit' can end a session without saving changes. 'Tools' can deliver a drop-down list of context or entitlement relevant follow-on actions, for example, request more information or cancel. While a specific Action Tab is illustrated in FIGS. 22 and 23, it is to be understood that the Action Tab can be configured and/or positioned as desired or appropriate.

Figure 24:
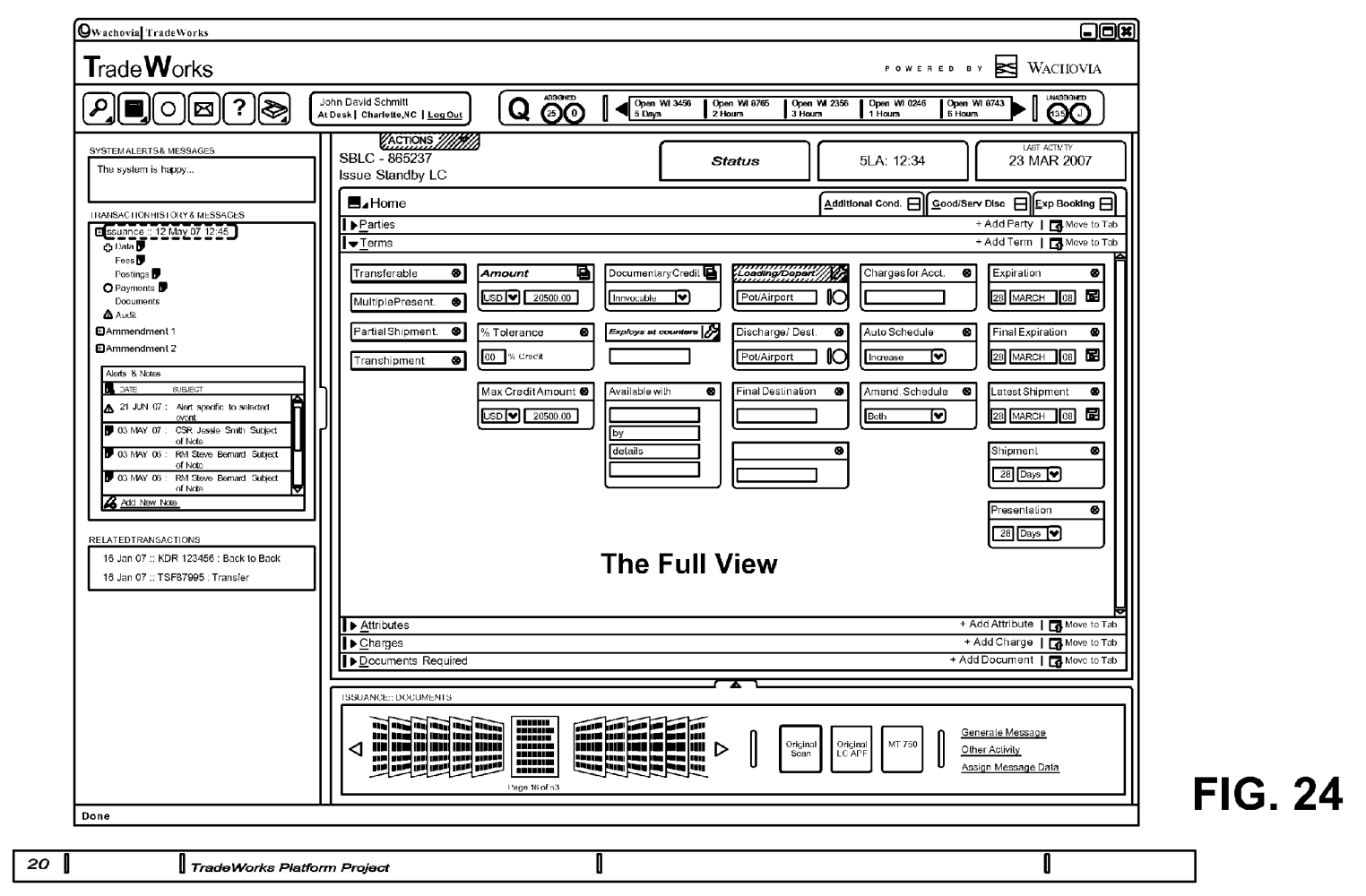

FIG. 24 illustrates an example of a fully completed screen in accordance with aspects of the innovation. In other words, FIG. 20 illustrates a completely populated screen that depicts each of the panes (Activity, Messaging and Viewing) as described herein.

Figure 25:
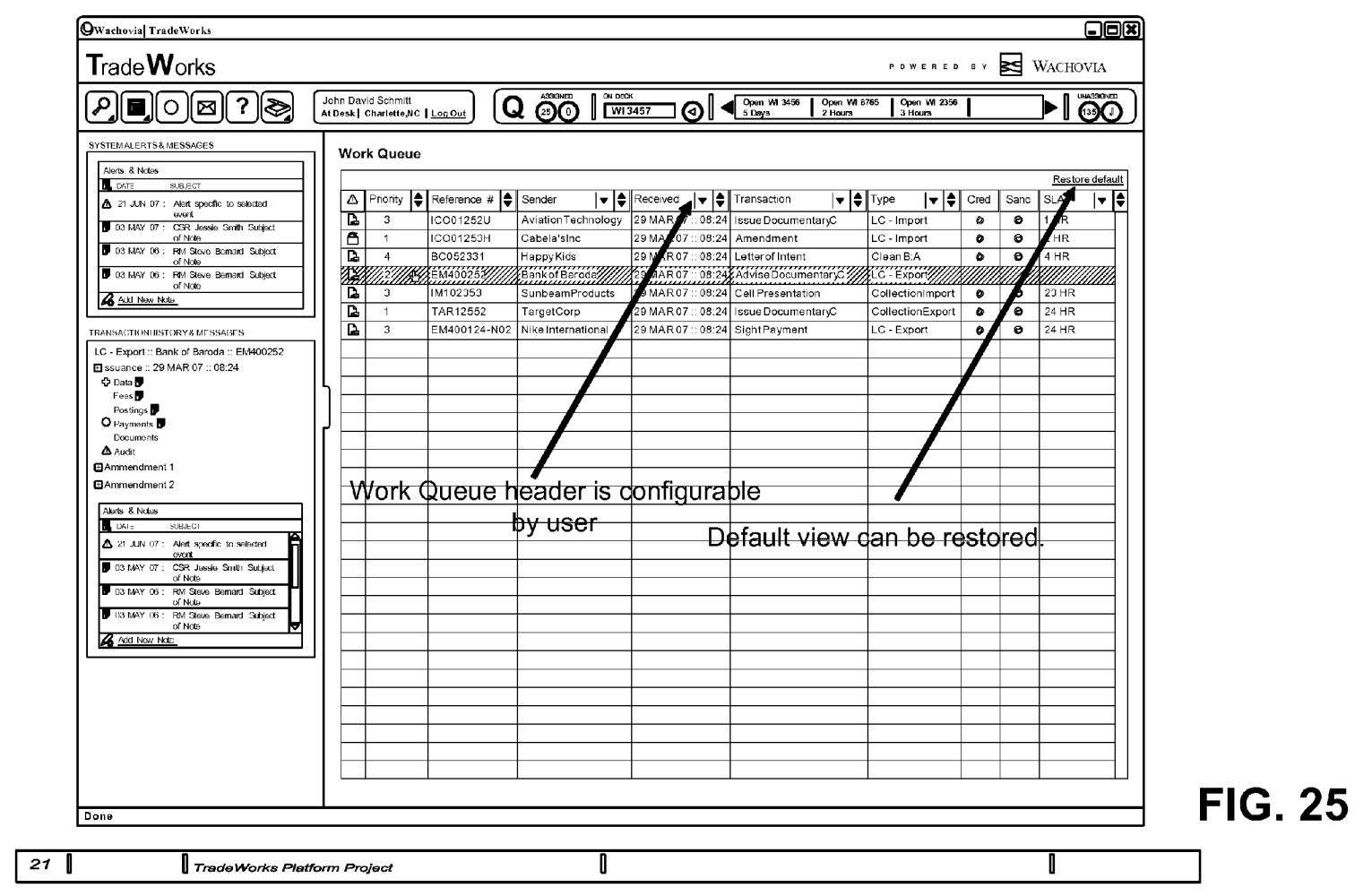
Figure 26:
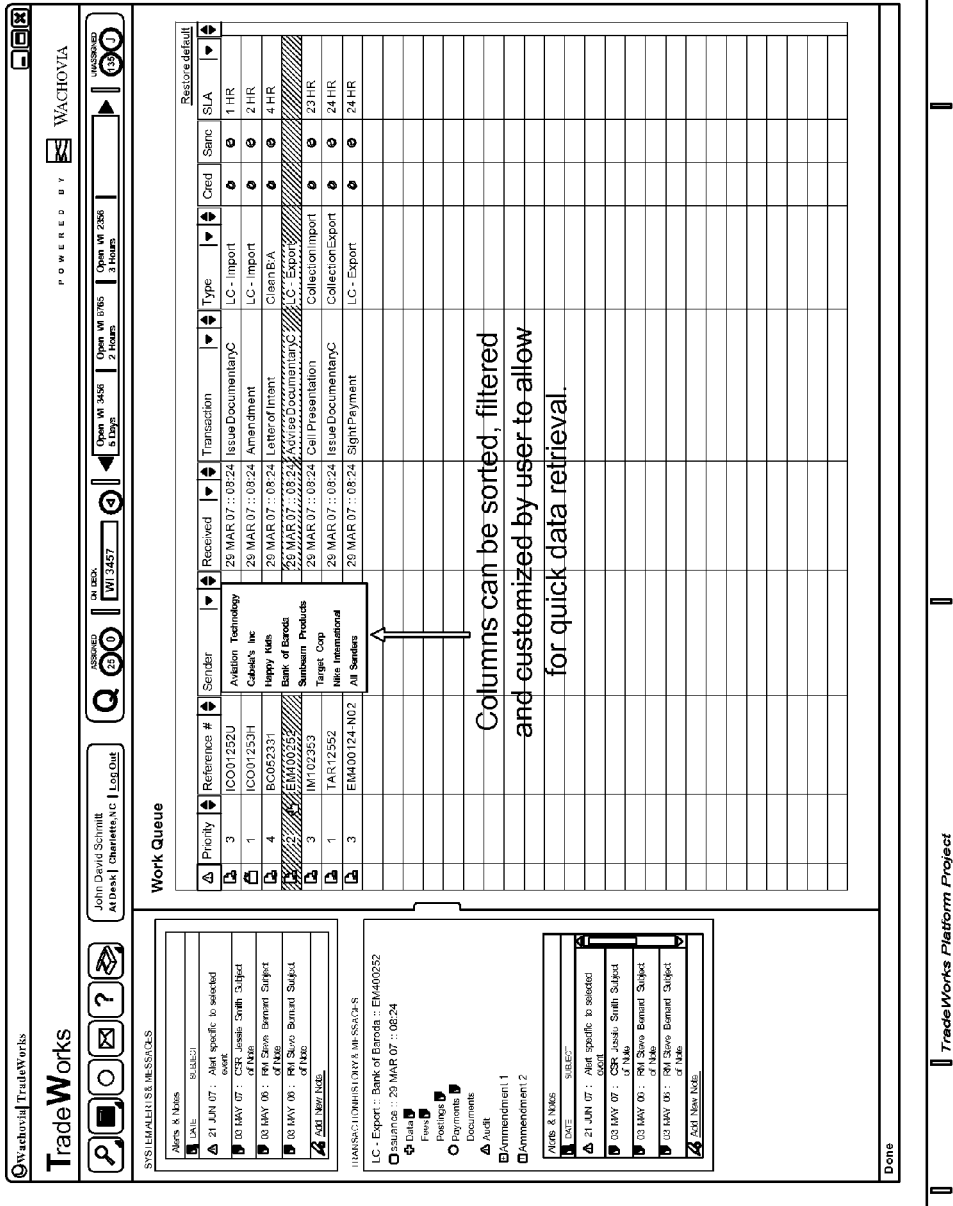
FIG. 26 illustrates examples of the work queue which essentially illustrates incorporation of sorting and filtering functionalities.

FIGS. 25 and 26 illustrate examples of the work queue which essentially illustrates incorporation of sorting and filtering functionalities. Essentially, the column headers can be used to effect sorting and/or ranking as desired or appropriate. Additionally, a 'Restore Default' option can be presented to restore the view to system defaults. FIG. 26 illustrates that columns can be sorted, filtered and/or customized by a user to allow for quick and/or efficient data retrieval.

Figure 27:
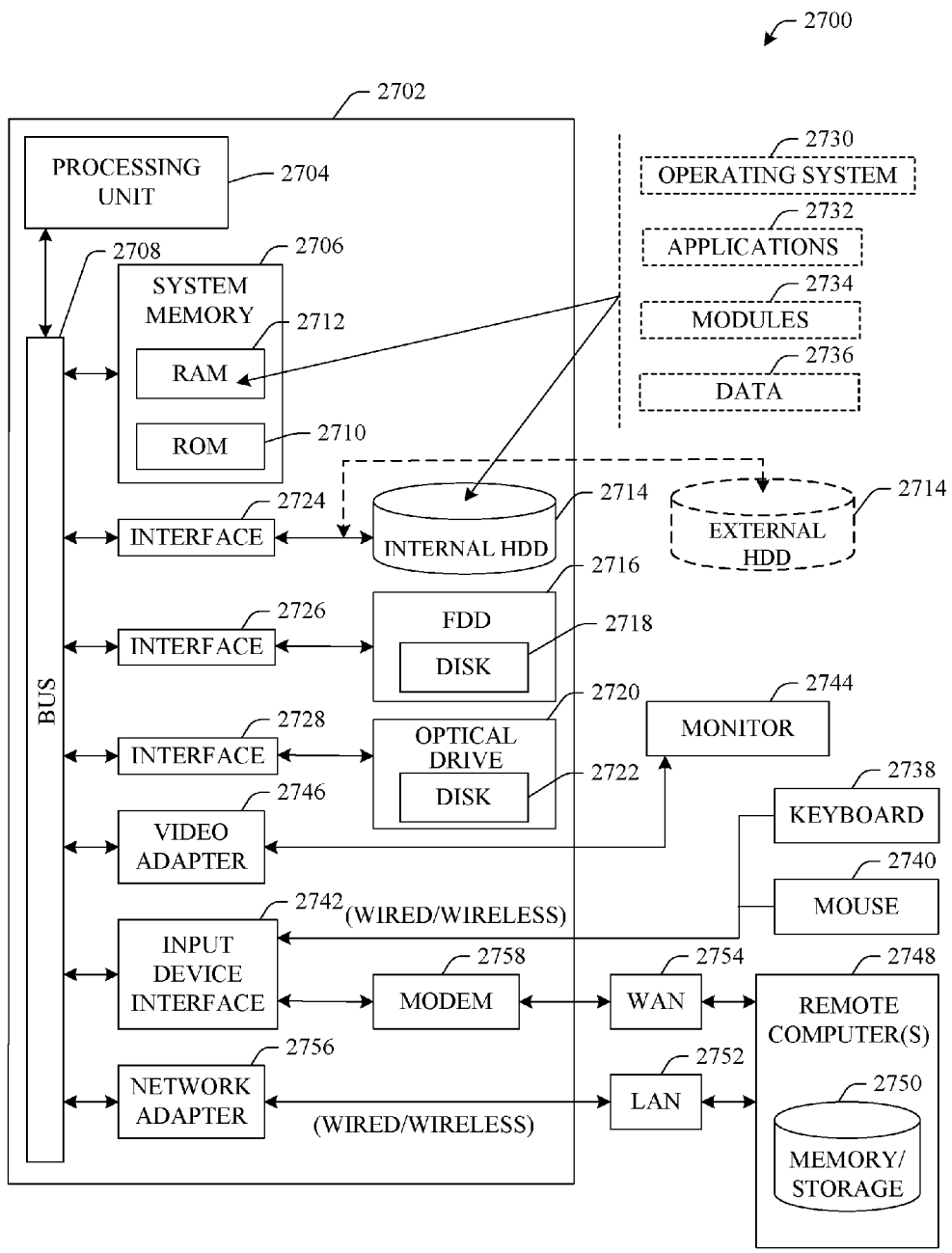
FIG. 27 illustrates a block diagram of a computer operable to execute the disclosed architecture.

Referring now to FIG. 27, there is illustrated a block diagram of a computer operable to execute the disclosed architecture. In order to provide additional context for various aspects of the subject innovation, FIG. 27 and the following discussion are intended to provide a brief, general description of a suitable computing environment 2700 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 27, the exemplary environment 2700 for implementing various aspects of the innovation includes a computer 2702, the computer 2702 including a processing unit 2704, a system memory 2706 and a system bus 2708. The system bus 2708 couples system components including, but not limited to, the system memory 2706 to the processing unit 2704. The processing unit 2704 can be any of various commercially available processors. Dual microprocessors and other multi-processor architectures may also be employed as the processing unit 2704.

The system bus 2708 can be any of several types of bus structure that may further interconnect to a memory bus (with or without a memory controller), a peripheral bus, and a local bus using any of a variety of commercially available bus architectures. The system memory 2706 includes read-only memory (ROM) 2710 and random access memory (RAM) 2712. A basic input/output system (BIOS) is stored in a non-volatile memory 2710 such as ROM, EPROM, EEPROM, which BIOS contains the basic routines that help to transfer information between elements within the computer 2702, such as during start-up. The RAM 2712 can also include a high-speed RAM such as static RAM for caching data.

The computer 2702 further includes an internal hard disk drive (HDD) 2714 (e.g., EIDE, SATA), which internal hard disk drive 2714 may also be configured for external use in a suitable chassis (not shown), a magnetic floppy disk drive (FDD) 2716, (e.g., to read from or write to a removable diskette 2718) and an optical disk drive 2720, (e.g., reading a CD-ROM disk 2722 or, to read from or write to other high capacity optical media such as the DVD). The hard disk drive 2714, magnetic disk drive 2716 and optical disk drive 2720 can be connected to the system bus 2708 by a hard disk drive interface 2724, a magnetic disk drive interface 2726 and an optical drive interface 2728, respectively. The interface 2724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 2712, including an operating system 2730, one or more application programs 2732, other program modules 2734 and program data 2736. All or portions of the operating system, applications, modules, and/or data can also be cached in the RAM 2712. It is appreciated that the innovation can be implemented with various commercially available operating systems or combinations of operating systems.

A user can enter commands and information into the computer 2702 through one or more wired/wireless input devices, e.g., a keyboard 2738 and a pointing device, such as a mouse 2740. Other input devices (not shown) may include a microphone, an IR remote control, a joystick, a game pad, a stylus pen, touch screen, or the like. These and other input devices are often connected to the processing unit 2704 through an input device interface 2742 that is coupled to the system bus 2708, but can be connected by other interfaces, such as a parallel port, an IEEE 1394 serial port, a game port, a USB port, an IR interface, etc.

A monitor 2744 or other type of display device is also connected to the system bus 2708 via an interface, such as a video adapter 2746. In addition to the monitor 2744, a computer typically includes other peripheral output devices (not shown), such as speakers, printers, etc.

The computer 2702 may operate in a networked environment using logical connections via wired and/or wireless communications to one or more remote computers, such as a remote computer(s) 2748. The remote computer(s) 2748 can be a workstation, a server computer, a router, a personal computer, portable computer, microprocessor-based entertainment appliance, a peer device or other common network node, and typically includes many or all of the elements described relative to the computer 2702, although, for purposes of brevity, only a memory/storage device 2750 is illustrated. The logical connections depicted include wired/wireless connectivity to a local area network (LAN) 2752 and/or larger networks, e.g., a wide area network (WAN) 2754. Such LAN and WAN networking environments are commonplace in offices and companies, and facilitate enterprise-wide computer networks, such as intranets, all of which may connect to a global communications network, e.g., the Internet.

When used in a LAN networking environment, the computer 2702 is connected to the local network 2752 through a wired and/or wireless communication network interface or adapter 2756. The adapter 2756 may facilitate wired or wireless communication to the LAN 2752, which may also include a wireless access point disposed thereon for communicating with the wireless adapter 2756.

When used in a WAN networking environment, the computer 2702 can include a modem 2758, or is connected to a communications server on the WAN 2754, or has other means for establishing communications over the WAN 2754, such as by way of the Internet. The modem 2758, which can be internal or external and a wired or wireless device, is connected to the system bus 2708 via the serial port interface 2742. In a networked environment, program modules depicted relative to the computer 2702, or portions thereof, can be stored in the remote memory/storage device 2750. It will be appreciated that the network connections shown are exemplary and other means of establishing a communications link between the computers can be used.

The computer 2702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 28:
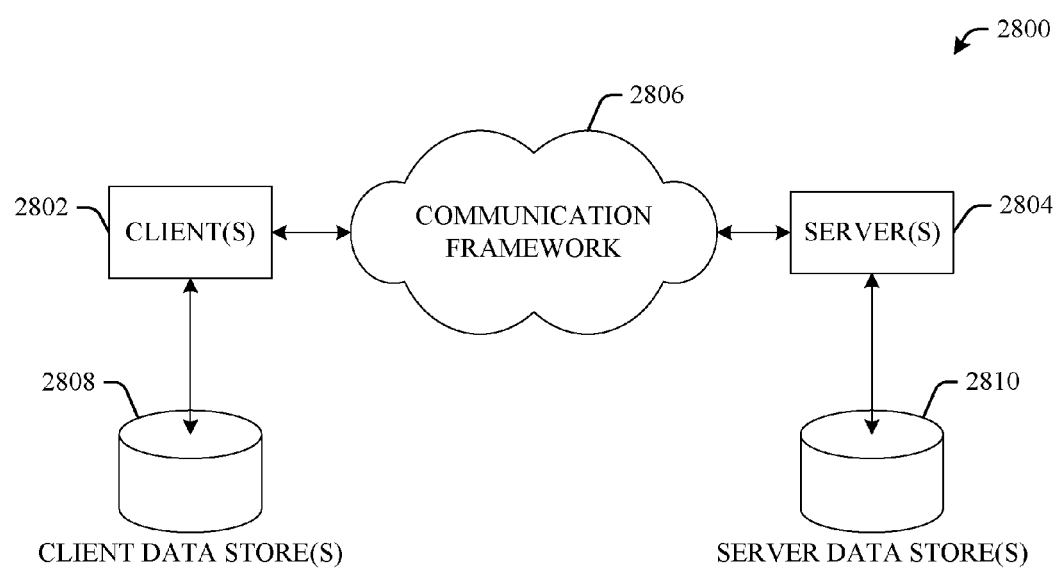
FIG. 28 illustrates a schematic block diagram of an exemplary computing environment in accordance with the subject innovation.

Referring now to FIG. 28, there is illustrated a schematic block diagram of an exemplary computing environment 2800 in accordance with the subject innovation. The system 2800 includes one or more client(s) 2802. The client(s) 2802 can be hardware and/or software (e.g., threads, processes, computing devices). The client(s) 2802 can house cookie(s) and/or associated contextual information by employing the innovation, for example.

The system 2800 also includes one or more server(s) 2804. The server(s) 2804 can also be hardware and/or software (e.g., threads, processes, computing devices). The servers 2804 can house threads to perform transformations by employing the innovation, for example. One possible communication between a client 2802 and a server 2804 can be in the form of a data packet adapted to be transmitted between two or more computer processes. The data packet may include a cookie and/or associated contextual information, for example. The system 2800 includes a communication framework 2806 (e.g., a global communication network such as the Internet) that can be employed to facilitate communications between the client(s) 2802 and the server(s) 2804.

Communications can be facilitated via a wired (including optical fiber) and/or wireless technology. The client(s) 2802 are operatively connected to one or more client data store(s) 2808 that can be employed to store information local to the client(s) 2802 (e.g., cookie(s) and/or associated contextual information). Similarly, the server(s) 2804 are operatively connected to one or more server data store(s) 2810 that can be employed to store information local to the servers 2804.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates trade services management, comprising:
    at least one processor coupled to a memory, wherein the processor is hardware, the processor executing:
    an analysis component that dynamically evaluates one of state or context of a trade services transaction, wherein the trade services transaction is a letter of credit (LC) transaction;
    a resource gathering component that dynamically locates and aggregates a plurality of resources associated with the trade services transaction based at least in part on the evaluated state or context of the trade services transaction;
    a rendering component that presents a subset of the plurality of resources, wherein the presentation is rendered via an interactive multi-panel display;
    a configuration component that generates the multi-panel display;
    a 'Queue Well' component that provides a compressed view of pending work associated with the trade services transaction, wherein the compressed view comprises an alert status that indicates whether an item of the pending work has reached an urgent state under Service Level Agreement (SLA) standards; and
    an 'Activity Center' component that provides a work palette for transaction types associated with the trade services transaction, wherein the 'Activity Center' component provides access to a history associated with the trade services transaction, wherein the history comprises at least one of an amendment or payment related to the trade services transaction.

2. The system of claim 1, wherein the resource gathering component employs the evaluation to identify the plurality of resources associated with the trade services transaction.

3. The system of claim 1, further comprising:
    a 'Message Center' component that provides access to data within the context of the work palette display;
    a 'Viewing Center' component that provides access to at least one of related documents or image files within the context of the work palette; and
    an 'Action Tab' component that provides a quick link control to at least one of a transaction complete, hold or abandon request within the work palette.

4. The system of claim 1, wherein the plurality of resources are at least one of data related to fees, general ledger postings, income created, payments made, changes, amendments, or images.

5. The system of claim 1, wherein the rendering component employs a Rich Internet Application (RIA) to render the multi-panel display.

6. A computer-implemented method of processing trade services, comprising:
storing computer executable instructions on a memory;
employing a hardware processor that executes the computer executable instructions stored on the memory to implement the following acts:
gathering a plurality of resources associated with a trade services transaction, wherein the trade services transaction is a letter of credit (LC) transaction, and wherein the plurality of resources comprise information related to a Service Level Agreement (SLA) associated with the trade services transaction;
generating a multi-panel display;
dynamically displaying a subset of the plurality of resources via the multi-panel display, wherein each panel of the multi-panel display interacts with the others of the multi-panel display in real-time, and wherein one or more panels display information related to a due date based at least in part on the SLA and the trade services transaction;
establishing a Queue Well that provides a compressed view of pending work associated with the trade services transaction, wherein the compressed view comprises an alert status that indicates whether an item of the pending work has reached an urgent state under SLA standards;
establishing an Activity Center panel that provides a work palette for transaction types associated with the trade services transaction, wherein the Activity Center component provides access to a history associated with the trade services transaction, wherein the history comprises at least one of an amendment or payment related to the trade services transaction;
escalating the status of at least one task based on the due date; and
presenting the at least one task with escalated status to a plurality of entities for resolution.

7. The computer-implemented method of claim 6, further comprising analyzing one of context or state of the trade services transaction to identify the plurality of resources associated with the trade services transaction.

8. The computer-implemented method of claim 6, wherein the plurality of resources are at least one of data related to fees, general ledger postings, income created, payments made, changes, amendments, or images associated with the trade services transaction.

9. The computer-implemented method of claim 6, further comprising configuring the subset of the plurality of resources into the multi-panel display.

10. The computer-implemented method of claim 6, wherein the act of dynamically displaying comprises:
consolidating the Queue Well together with a Message Center panel, the Activity Center panel and a Viewing Center panel; and
displaying, upon a single display, the Queue Well together with the Message Center panel, the Activity Center panel and the Viewing Center panel.

11. The computer-implemented method of claim 10, wherein the Queue Well, the Message Center panel, the Activity Center panel and the Viewing Center panel interact in real-time with respect to one of the plurality of tasks.

12. The computer-implemented method of claim 11, further comprising displaying a floating Action Tab that enables the operator to at least one of Finish a task, place a task On-Hold or Exit a task.

* * * * *